United States Patent
Frank et al.

(10) Patent No.: US 10,865,813 B2
(45) Date of Patent: Dec. 15, 2020

(54) COMPRESSED AIR SUPPLY INSTALLATION AND METHOD FOR OPERATING A PNEUMATIC INSTALLATION

(75) Inventors: Dieter Frank, Hannover (DE); Frank Meissner, Hannover (DE); Uwe Stabenow, Laatzen (DE)

(73) Assignee: WABCO GMBH, Hannover (DE)

( * ) Notice: Subject to any disclaimer, the term of this patent is extended or adjusted under 35 U.S.C. 154(b) by 304 days.

(21) Appl. No.: 13/994,248

(22) PCT Filed: Nov. 24, 2011

(86) PCT No.: PCT/EP2011/005915
§ 371 (c)(1),
(2), (4) Date: Jun. 14, 2013

(87) PCT Pub. No.: WO2012/079698
PCT Pub. Date: Jun. 21, 2012

(65) Prior Publication Data
US 2013/0276899 A1    Oct. 24, 2013

(30) Foreign Application Priority Data

Dec. 16, 2010 (DE) .................. 10 2010 054 715
Aug. 5, 2011 (DE) .................. 10 2011 109 500

(51) Int. Cl.
F15B 13/02    (2006.01)
F15B 21/048    (2019.01)
(Continued)

(52) U.S. Cl.
CPC ........ *F15B 13/022* (2013.01); *B60G 17/0523* (2013.01); *B60T 17/004* (2013.01);
(Continued)

(58) Field of Classification Search
CPC ........ B60T 17/004; B60T 17/02; B60T 17/04; G05D 16/106; B60G 2500/2021;
(Continued)

(56) References Cited

U.S. PATENT DOCUMENTS 3,807,175 A * 4/1974 Kubik ..................... F15B 11/02
60/444
4,148,249 A * 4/1979 Jacobs et al. .................. 91/485
(Continued)

FOREIGN PATENT DOCUMENTS

| DE | 35 42 974 A1 | 6/1987 |
|---|---|---|
| DE | 42 34 626 | 4/1994 |
| DE | 199 11 933 B4 | 9/1999 |
| DE | 198 21 420 C1 | 10/1999 |
| DE | 101 21 582 C2 | 11/2002 |
| DE | 102 23 405 B4 | 12/2003 |
| DE | 102005063229 A1 | 6/2007 |
| EP | 0 978 397 B1 | 2/2000 |
| EP | 1 046 521 B1 | 10/2000 |
| EP | 1 165 333 B2 | 1/2002 |
| EP | 1 216 860 B1 | 6/2002 |
| EP | 1 233 183 B1 | 8/2002 |

(Continued)

*Primary Examiner* — Atif H Chaudry
(74) *Attorney, Agent, or Firm* — Leydig, Voit & Mayer, Ltd.

(57) ABSTRACT

A compressed air supply installation for operating a pneumatic installation, especially an air suspension installation of a vehicle, includes a compressed air supply unit, a compressed air port towards the pneumatic installation, a venting port towards the surroundings, a first pneumatic connection between the compressed air supply and the compressed air port, the first pneumatic connection having an air drier and a shut-off valve, and a second pneumatic connection between the compressed air port and the venting port. The shut-off valve is a pneumatically pilot-controlled check valve.

33 Claims, 14 Drawing Sheets

(51) Int. Cl.

| | |
|---|---|
| *F15B 21/044* | (2019.01) |
| *B60G 17/052* | (2006.01) |
| *G05D 16/06* | (2006.01) |
| *B60T 17/00* | (2006.01) |
| *B60T 17/04* | (2006.01) |
| *B60T 17/02* | (2006.01) |

(52) U.S. Cl.
CPC .............. *B60T 17/02* (2013.01); *B60T 17/04* (2013.01); *F15B 21/044* (2013.01); *F15B 21/048* (2013.01); *G05D 16/06* (2013.01); *B60G 2500/203* (2013.01); *B60G 2500/205* (2013.01); *B60G 2500/2021* (2013.01); *F15B 2211/3059* (2013.01); *F15B 2211/30505* (2013.01); *F15B 2211/31564* (2013.01); *F15B 2211/655* (2013.01); *F15B 2211/8855* (2013.01); *Y10T 137/0318* (2015.04); *Y10T 137/2589* (2015.04); *Y10T 137/3087* (2015.04); *Y10T 137/7782* (2015.04); *Y10T 137/7876* (2015.04); *Y10T 137/87193* (2015.04)

(58) Field of Classification Search
CPC ........ B60G 2500/205; B60G 2500/203; B60G 17/0523; Y10T 137/7782; Y10T 137/7876; Y10T 137/87193; Y10T 137/2589; F15B 21/044; F15B 13/022; F15B 21/048; F15B 2211/30505; F15B 2211/8855
USPC ..................... 137/596.14, 522, 495, 115.07; 280/124.16, 124.159; 303/3
See application file for complete search history.

(56) References Cited

U.S. PATENT DOCUMENTS

| | | | | |
|---|---|---|---|---|
| 4,624,445 | A | * | 11/1986 | Putnam ...................... 251/63.4 |
| 4,756,548 | A | | 7/1988 | Kaltenthaler et al. |
| 4,793,590 | A | * | 12/1988 | Watson ...................... 251/63.5 |
| 5,303,549 | A | * | 4/1994 | Berchtold et al. .............. 60/414 |
| 6,074,177 | A | | 6/2000 | Kobayashi et al. |
| 6,098,967 | A | | 8/2000 | Folchert |
| 6,332,623 | B1 | * | 12/2001 | Behmenburg et al. .. 280/124.16 |
| 6,354,617 | B1 | | 3/2002 | Behmenburg et al. |
| 6,598,924 | B2 | | 7/2003 | Palmer et al. |
| 6,726,224 | B2 | | 4/2004 | Jurr et al. |
| 6,752,402 | B2 | | 6/2004 | Grotendorst et al. |
| 6,817,600 | B2 | | 11/2004 | Ocker et al. |
| 7,032,895 | B2 | | 4/2006 | Folchert |
| 2002/0032929 | A1 | * | 3/2002 | Boldon et al. .................... 5/689 |
| 2002/0136645 | A1 | | 9/2002 | Folchert et al. |
| 2007/0246999 | A1 | * | 10/2007 | Hilberer ................. B60T 17/02 303/13 |
| 2010/0059125 | A1 | * | 3/2010 | Kot .......................... F15B 13/01 137/485 |
| 2013/0306192 | A1 | * | 11/2013 | Hennig ................. B60C 23/003 141/4 |

FOREIGN PATENT DOCUMENTS

| | | |
|---|---|---|
| EP | 1 243 477 A2 | 9/2002 |
| EP | 1243447 A2 | 9/2002 |
| EP | 1 380 453 B1 | 1/2004 |
| JP | 05133483 A | 5/1993 |

* cited by examiner

THROUGH FLOW MODE

COMPRESSED AIR SUPPLY INSTALLATION AND METHOD FOR OPERATING A PNEUMATIC INSTALLATION

FIELD OF THE INVENTION

The invention generally relates to a compressed air supply installation for a pneumatic system, and to a method for operating a pneumatic installation, such as an air spring installation on a vehicle.

BACKGROUND OF THE INVENTION

Compressed air supply installations are used in vehicles of all kinds, in particular for supplying an air spring installation on a vehicle with compressed air. Air spring installations can also comprise leveling devices, by means of which the distance between the vehicle axle and the vehicle body can be adjusted. An air spring installation of a pneumatic system comprises a number of pneumatic bellows connected pneumatically to a common line (gallery), which can raise the vehicle body as they are filled to an increasing extent and, correspondingly, can lower the vehicle body as filling decreases. As the distance between the vehicle axle and the vehicle body or ground clearance increases, spring travels become longer and it is possible to cope even with relatively large irregularities in the ground without the occurrence of contact with the vehicle body. Such systems are increasingly being used in all-terrain vehicles and sport utility vehicles (SUV). Particularly, with SUVs, it is desirable, in the case of very powerful engines, that the vehicle should, on the one hand, be provided with a relatively small ground clearance for high speeds on the road and, on the other hand, with a relatively large ground clearance for off-road use. It is furthermore desirable to implement a change in the ground clearance as quickly as possible, and this increases the demands in respect of the rapidity, flexibility and reliability of a compressed air supply installation.

In order to ensure long-term operation of the compressed air supply installation, a main pneumatic line of the compressed air supply installation has an air dryer, by means of which the compressed air can be dried. This avoids accumulation of moisture in the pneumatic system. At relatively low temperatures, moisture can lead to the formation of crystals that damage valves and can furthermore lead to unwanted faults in the compressed air supply installation and in the pneumatic installation. An air dryer has a desiccant, generally in the form of a granular fill, through which the compressed air can flow, allowing the granular fill to take up moisture contained in the compressed air by adsorption. If appropriate, an air dryer can be designed as a regenerative air dryer. This can be accomplished by arranging for the dried compressed air from the pneumatic installation, in particular an air spring installation, to flow through the granular fill—mostly in a countercurrent but also partially in a co-current pattern relative to the filling direction during each venting cycle. Regeneration of the air dryer is made possible essentially by a pressure swing at the air dryer, with a pressure prevailing during regeneration generally being lower in comparison with adsorption in order to enable moisture to be released from the granules. For this purpose, the vent valve arrangement can be opened, with the regeneration capacity of the air dryer generally being dependent on the pressure conditions and the pressure swing amplitude in the compressed air supply installation. For a "pressure swing adsorption process" of this kind, too, it is desirable to make a compressed air supply installation flexible and, at the same time, reliable. In particular, the aim is, on the one hand, to allow relatively quick venting, and yet make available a pressure swing amplitude that is sufficiently high low air pressure—i.e., during regeneration—for regeneration of the air dryer.

DE 199 11 933 B4 discloses a compressed air supply installation having an air dryer with a first compressed air supply line, wherein the compressed air is passed through a desiccant in the air dryer, and with a second compressed air supply line, through which there can be a flow without the compressed air being passed through the desiccant.

Many different approaches to the design of a first pneumatic connection between a compressed air feed and a pneumatic installation are known. These allow for the basic functions of a compressed air supply installation when supplying air to the pneumatic installation and releasing air from the pneumatic installation. With respect to the requirement for relatively quick venting with an air pressure that is nevertheless sufficiently low for regeneration of the air dryer, these approaches are still in need of improvement, however.

DE 102 23 405 B4 discloses an air spring system on a motor vehicle with a compressed air supply installation having a delivery line for connecting a compressor to the air springs and a vent line, via which the delivery line can be connected to atmosphere while being capable of being shut off by means of a switching valve. A segment of the delivery line in which a restrictor is arranged in parallel with a non-return valve and in parallel with a further switching valve, the segment being designed as a pneumatic parallel circuit, is provided between a dryer and level control valves in a gallery of the air spring installation. The switching valve in the vent line and the switching valve in the segment of the delivery line are connected to the same output stage of a control unit by electric control lines.

DE 10121582 C2 discloses an air supply unit for an air suspension installation, in which a vent valve in a vent line, an air spring valve in the gallery of the air suspension installation and an air control valve are provided. All three valves are connected to an electronic control unit. The air control valve is connected in parallel with a non-return valve in a segment of a delivery line between a dryer and a spring valve, the segment being designed as a pneumatic parallel circuit, with the result that, although air can be taken into the air spring installation unhindered, it can only be released again in a controlled manner via the air control valve. To release compressed air from the air suspension installation, all three of the valves mentioned above are opened.

EP 1216 860 B1 discloses a leveling installation for a motor vehicle, having air springs and having a control unit, which exercises open-loop or closed-loop control over the functions of filling and emptying in accordance with the level of the vehicle body. Among the elements connected to the control unit are a controllable directional control valve of a compressed air supply installation and a controllable directional control valve arranged ahead of a reservoir. The controllable directional control valve of the compressed air supply installation is arranged in parallel with a non-return valve.

U.S. Pat. No. 6,098,967 discloses a compressed air supply installation of the general type under consideration, in which a segment designed as a pneumatic parallel circuit and containing two branch lines connected in parallel with one another is arranged in the main pneumatic line between the air dryer and the air spring installation, wherein, in a first branch line, a non-return valve, through which there can be a flow for filling the air spring installation, and, in a second branch line, a non-return valve, through which there can be a flow for venting the air spring installation, are connected in series with a restrictor and a switching valve.

A similar compressed air supply installation is disclosed in EP 1046 521 B1, which has a non-return valve that can be shut off in the venting direction and a stepped piston of a controllable directional control valve that can be released in the venting direction, the valve and piston being arranged pneumatically in parallel.

Similarly, EP 0 978 397 B1 also provides a pneumatic parallel circuit of a non-return valve that shuts off in the venting direction and a pneumatically pilot-controlled directional control valve that can be released in the venting direction. A physical embodiment of this circuit can be found in EP1 233 183 B1, for example, in which a relatively complex construction of the pneumatic parallel circuit comprising at least three valves can be found. Such a construction is intended to make a venting process more effective in terms of time, but proves relatively complex and expensive and requires a relatively large number of components.

The need for further improvement in the connection of an air spring installation to the compressed air supply installation is problematic in all of the compressed air supply installations noted above owing to the fact that the segment above is generally designed as a parallel circuit in a main pneumatic line.

EP 1 243 447 A2 (FIG. 9) discloses a leveling installation having a series arrangement of a first directional control valve and of a second directional control valve in a gallery of a pneumatic installation, for which the second directional control valve is arranged in the compressed air line between the first controllable directional control valve and the air springs.

EP 1 380 453 B1 discloses a closed leveling installation for vehicles, by means of which a vehicle body is sprung relative to at least one vehicle axle and in which a compressed air reservoir is isolated from a compressed air supply installation independently of an air spring installation, by means of a 4/4-way valve.

These pneumatic systems too are capable of improvement. In particular, a compressed air installation of the kind mentioned in EP 1 165 333 B2 requires improvement—in the absence of an isolating valve between the compressed air supply installation and a pneumatic installation, this compressed air installation has the disadvantage that the dryer volume is also filled each time the pneumatic installation operates. Before the next regulating process, this volume must be completely or partially vented. This pneumatic energy (pressure multiplied by the volume) is lost during venting and must be recompressed by the compressor; this is evident from a disadvantageous loss of efficiency in the compressed air supply installation.

Applicant's DE 35 42 974 A1 discloses a leveling device provided with air filters and having a compressed air supply installation for vehicles of the general type under consideration, by means of which a predetermined distance between the vehicle cell and the vehicle axle can be adjusted in accordance with the vehicle loading by filling or emptying the air springs. The device has a safety valve that can be controlled by means of the pressure in the air springs and an isolating valve with respect to the pneumatic installation in the form of a first non-return valve. In an installation of this kind, the air dryer can be regenerated via a restrictor and a second non-return valve that can be opened counter to a filling direction, which is arranged in a branch line.

The compressed air supply installation in DE 35 42 974 A1 has long proven its worth, but is still capable of improvement. The installation is advantageously suitable for saving compressed air, even during regeneration of the air dryer, through isolation of the compressed air supply installation and the pneumatic installation by means of the first non-return valve. Nevertheless, the installation disclosed in DE 35 42 974 A1 may not be ideal for advanced applications that necessitate relatively flexible and rapid handling of the compressed air within relatively short periods of time.

SUMMARY OF THE INVENTION

Generally speaking, it is an object of the present invention to provide an improved compressed air supply installation and method for operating a pneumatic installation that function reliably and yet flexibly, and, if required, quickly, in a way that protects an air dryer from negative effects. That is, it is an object of the present invention to provide a compressed air supply installation that is of relatively simple construction, and yet, on the one hand, allows relatively quick venting combined with dryer regeneration in an advantageous manner. Another object of the invention is improved acoustics in the compressed air supply installation.

According to an embodiment of the present invention, a compressed air supply installation for operating a pneumatic installation, in particular an air spring installation on a vehicle, is provided, which has:
  a compressed air feed,
  a compressed air port leading to the pneumatic installation,
  a vent port leading to the environment,
  a first pneumatic connection between the compressed air feed and the compressed air port, which connection has an air dryer and a non-return valve,
  a second pneumatic connection between the compressed air port and the vent port.

The isolating valve can be formed with a pilot-operated non-return valve. In particular, the non-return valve can be pneumatically pilot-operated. In principle, the non-return valve can be released in an expedient manner as required. A vent line is preferably connected to the pilot-operated non-return valve. In principle, this can be an expediently designed control line, depending on requirements, e.g., an electrical, magnetic or pneumatic control line suitable for activating the non-return valve in such a way as to release it. The non-return valve is preferably pneumatically pilot-operated and, for this purpose, connected to a pneumatic pilot operation line.

The first pneumatic connection is preferably designed as a main pneumatic line, and the second pneumatic connection is preferably designed as a vent line.

The first and second pneumatic connections—i.e., the main pneumatic line and the vent line—can be separate lines, which are connected to a common compressed air feed port, for example. This provides a particularly advantageous basis for relatively quick venting. In an alternative embodiment, however, it is also possible for the first and second pneumatic connections to be completely or partially combined, that is, it is also possible for the main pneumatic line and the vent line to be the same lines and to allow bidirectional flow both for venting and for air admission to a pneumatic installation.

It is advantageous if compressed air is made available to the compressed air supply installation from a compressed air feed at a pressure level within a range of from 5 to 20 bar. The compressed air for the compressed air feed can be produced, in particular, by an air compressor arranged between an air feed and a compressed air feed port. To supply the pneumatic installation, the compressed air feed is connected to a compressed air port leading to the pneumatic installation by a first pneumatic connection. The first pneumatic connection of the compressed air supply installation advantageously has a main pneumatic line, in particular, in the form of a single pneumatic line. Moreover, the compressed air supply installation has a second pneumatic connection, advantageously, a vent line, having a controllable vent valve, which pneumatic connection is connected pneumatically to the main pneumatic line and to a vent port leading to the environment. The compressed air port and/or the compressed air feed is thereby connected pneumatically, in particular, via a controllable vent valve, to a vent port leading to the environment. By means of the controllable vent valve, the compressed air supply installation can be vented, e.g., by discharging air, toward the vent port in order to vent the pneumatic installation.

An advantageous design of the first pneumatic connection between the compressed air feed and a compressed air port leading to the pneumatic installation can provide a basis for improved dryer regeneration and also for flexible and, if required, quick venting of the compressed air supply installation and/or of the pneumatic installation or for the admission of air thereto. A main pneumatic line for the formation of the, preferably single, pneumatic connection can be of relatively simple design for this purpose, preferably, with a single pilot-operated non-return valve.

The installation described in Applicant's DE 35 42 974 A1 provides a good basis for the pneumatic decoupling of the compressed air supply installation from a pneumatic installation by using a non-return valve as an isolating valve in the first pneumatic connection. However, a venting process can be carried out more flexibly and, if required, more quickly—with or without dryer regeneration—if the isolating valve is formed with a non-return valve, preferably, a single non-return valve, preferably, a pneumatically pilot-operated non-return valve. This makes use of the advantages of a non-return valve, which is relatively simple to implement, and, with the pneumatic releasability of the non-return valve, furthermore provides particularly effective compressed air handling that is quick and flexible. This advantageously avoids a situation where an air dryer is filled with compressed air from the pneumatic installation, in particular from the gallery thereof, in any circuit configuration of a pneumatic installation, e.g., with a directional control valve arranged ahead of a bellows or a reservoir. The admission of compressed air to the air dryer, which may be disadvantageous for regeneration, is avoided by means of the non-return valve, which is advantageously pneumatically pilot-operated. The pneumatically pilot-operated non-return valve allows flow with relatively little operating resistance in the filling direction, i.e., in a direction from the air dryer to the compressed air port. In other words, the pneumatically pilot-operated non-return valve is pneumatically open in a filling direction, i.e., in a direction from the compressed air feed to the compressed air port, in a shutoff mode. In an opposite, venting direction, the pneumatically pilot-operated non-return valve is pneumatically closed in shutoff mode, i.e., cuts off the first pneumatic connection between the compressed air feed and the compressed air port, ensuring that the pneumatic installation is decoupled from the compressed air supply installation. However, the releasability of the non-return valve means that the valve can be switched from shutoff mode to a release mode when required, thus allowing compressed air to flow virtually unhindered through the first pneumatic connection, even in a direction from the compressed air port to the compressed air feed—irrespective of the pressure conditions at ports of the pilot-operated non-return valve in the first pneumatic connection—when the pilot-operated non-return valve is appropriately activated.

It is this feature that is advantageous in comparison with the known compressed air supply installation of the kind described in DE 35 42 974 A1—venting of a pneumatic installation can be achieved in a relatively simple manner, even via the first pneumatic connection, and therefore relatively time-consuming and complex guidance of the compressed air during venting and/or dryer regeneration via branch lines, which is possibly associated with loss of pressure, is avoided. The present invention furthermore offers the advantageous possibility of designing the pilot-operated non-return valve for a very wide variety of operating functions of the compressed air supply installation. For example, it is also possible to provide the pilot-operated non-return valve with structure that can act as a vent valve in the second pneumatic connection. It is also possible for the pneumatically pilot-operated non-return valve to be provided with suitable opening cross sections, i.e., nominal diameters, which—possibly on an adjustable basis—help with quick venting while nevertheless promoting advantageous acoustics and dryer regeneration.

In particular, using a single pilot-operated non-return valve, the main pneumatic line between the compressed air feed and the compressed air port can be shut off from a compressed air flow from the pneumatic installation routed via the compressed air port leading to the air dryer or to the vent port. This reduces the number of components that are normally required to implement an isolating valve in the form of an isolating valve arrangement comprising a plurality of valves. It is, in principle, sufficient to provide a single pilot-operated non-return valve for shutting off the main pneumatic line.

The term "pilot-operated non-return valve" should be taken to mean, in particular, a non-return valve that opens automatically in the direction of opening from the air dryer to the compressed air port, i.e., only against a limited spring force. A non-return valve of this kind thus closes virtually by itself in the venting direction under the action of the spring force. With such non-return valve, the shutoff action in the venting direction can be canceled. In principle, this can be accomplished according to requirements by means of an expediently designed control line.

During a filling process of a pneumatic installation, the pilot-operated non-return valve opens virtually automatically, in particular by a pneumatic method. During a venting process, it shuts off the main pneumatic line but can be released mechanically, it being possible for the corresponding mechanism, e.g., that of a control piston or some other actuating element, to be actuated pneumatically. In other words, the non-return valve is preferably pneumatically and/or mechanically released.

As a preferred option, provision is made, during the filling process, for the pilot-operated non-return valve to open automatically by pneumatic means when pressurized by a compressed air flow in the filling direction, i.e., from the compressed air supply installation to the pneumatic installation. In concrete terms, the control piston can have a first switching position assigned to a shutoff mode, in which a shutoff valve element can be raised from the shutoff valve seat of the pilot-operated non-return valve automatically—i.e., pneumatically by pressurization—in a filling direction. In concrete terms, the shutoff valve element is advantageously held under a spring load on or in the direction of a shutoff valve seat in the shutoff mode, allowing the element to be raised from the shutoff valve seat against a spring force and under the action of compressed air in the filling direction, i.e., automatically.

A compressed air flow can be routed in the opposite direction to the filling direction, i.e., in the venting direction, during venting, with the control piston being transferred pneumatically from the first switching position to a second switching position assigned to a shutoff mode by means of a control valve, using a pressure derived from the main pneumatic line, and releasing the pilot-operated non-return valve mechanically, in particular, raising the shutoff valve element from the shutoff valve seat mechanically. In the release mode, the shutoff valve element is raised from the shutoff valve seat by the action of the control piston—i.e., mechanically—and the non-return valve released in this way allows flow in the venting direction.

According to an embodiment of the present invention, a method for operating a pneumatic installation by means of a compressed air supply installation comprises:
  in the filling direction—filling the pneumatic installation by means of a compressed air flow routed via a main pneumatic line from the compressed air supply installation, wherein a pilot-operated non-return valve in the main pneumatic line opens automatically;
  holding the pressure in the pneumatic installation, wherein the main pneumatic line is shut off against a compressed air flow from the pneumatic installation by means of the pilot-operated non-return valve, and
  in the venting direction, i.e., counter to the filling direction—venting the pneumatic installation by means of the compressed air flow routed via the main pneumatic line from the pneumatic installation, wherein the pilot-operated non-return valve in the main pneumatic line is released.

For carrying out the method, a compressed air supply installation according to an embodiment of the present invention includes:
  a compressed air feed.
  a compressed air port leading to the pneumatic installation,
  a vent port leading to the environment,
  the main pneumatic line between the compressed air feed and the compressed air port, which line has an air dryer and an isolating valve, and
  a vent line between the compressed air port and the vent port.

An isolating valve can be formed with a non-return valve, preferably a single non-return valve, in particular a pneumatically pilot-operated non-return valve, by means of which:
  the main pneumatic line is shut off in a first operating state from a compressed air flow from the pneumatic installation routed via the compressed air feed and the air dryer, in particular, to the vent port, and,
  in a second operating state, the non-return valve, in particular, a pneumatically pilot-operated non-return valve, is released and the pneumatic installation is vented by means of a compressed air flow from the pneumatic installation routed via the compressed air port and the air dryer, in particular, to the vent port.

It is advantageous if the method furthermore includes:
  releasing the non-return valve by means of a pressure derived from the main pneumatic line.

A pneumatic control signal is relatively easy to implement and is particularly effective. In principle, however, any other control signal can also be used. The non-return valve can, alternatively or additionally, be released by an electrical or magnetic control signal.

In one embodiment, a control valve and a pneumatic pilot operation line can be provided between the control valve and a non-return valve designed as a pneumatic release valve. The control valve can preferably be designed at least for releasing the non-return valve. A control valve designed purely and simply for releasing the non-return valve and for controlling, in particular, simultaneously controlling, a vent valve is particularly advantageous. The control valve is preferably used to release the non-return valve by pressurizing the pneumatic pilot operation line with a pressure derived from the main pneumatic line via the pneumatic control line. In particular, it is advantageous to simultaneously activate venting of a vent valve in the vent line, i.e., to make it open.

In another embodiment, the compressed air supply installation can have a control valve, a pneumatic control line between the main pneumatic line and the control valve, and a pneumatic pilot operation line between the control valve and the non-return valve. In particular, a vent valve can be provided in the vent line. The control valve can be used to release the non-return valve by pressurizing the pneumatic pilot operation line with a pressure derived from the main pneumatic line via the pneumatic control line. In particular, the vent valve in the vent line is simultaneously controlled, in the present case, in particular, opened. This has the advantage that the non-return valve is simultaneously opened on both sides by activating a single control valve, allowing the compressed air flow from the pneumatic installation to be fed to the vent port by releasing said non-return valve.

In the context of a preferred embodiment, the pilot-operated non-return valve is formed as a unit with the vent valve. This is especially compact and particularly efficient and effective with respect to time during venting.

It is advantageous for the pneumatically pilot-operated non-return valve to be arranged in the first and/or second pneumatic connection between the air dryer and the compressed air port leading to the pneumatic installation. In particular, the pneumatically pilot-operated non-return valve can be arranged in a main pneumatic line that advantageously forms the first pneumatic connection, i.e., in the main pneumatic line itself. A relatively complex design of a branch line or parallel line to the main pneumatic line involving an increased number of components and valves is, thus, advantageously avoided. The main pneumatic line is the only pneumatic line of the first pneumatic connection and extends between the compressed air feed and a compressed air port leading to the pneumatic installation. The compressed air feed, the air dryer, the pneumatically pilot-operated non-return valve and the compressed air port leading to the pneumatic installation are advantageously arranged in the main pneumatic line in the stated sequence in the direction of air admission.

As explained below, the non-return valve, which is preferably pneumatically pilot-operated, can be arranged at least in part—i.e., preferably, with structure that serves to form a vent valve in the non-return valve—in the second pneumatic connection. The functional structure for forming a vent valve with the non-return valve is preferably embodied in a single pilot-operated non-return valve, that is, in particular, is integrated into a single valve housing.

In principle, the pneumatically pilot-operated non-return valve can be embodied as a shutoff valve in various forms, e.g., as a non-return valve, as a throttle check valve, as a shuttle valve, as a dual-pressure valve or as a fast-acting vent valve. An isolating valve with a restrictor and the non-return valve in a pneumatic series circuit in the first pneumatic connection, i.e., advantageously in the main pneumatic line, is particularly advantageous. For this purpose, it is advantageous if the pilot-operated non-return valve is arranged pneumatically in series with and downstream of the restrictor in the filling direction in the main pneumatic line; thus, when the pneumatic installation is being filled, the air flows first through the restrictor and then through the pilot-operated non-return valve.

As an alternative or in addition, the isolating valve can also have the non-return valve in the form of a throttle check valve.

In particular, embodiments provide the combination of a non-return valve with an—advantageously adjustable—restrictor. The—advantageously adjustable—restrictor or a sequence of—possibly different—restrictors, such as nominal orifice diameters or the like in the non-return valve, can expediently be used to provide an optimum configuration of a pressure swing amplitude for dryer regeneration. Improved dryer regeneration is distinguished on the basis of an optimized pressure swing amplitude, wherein, as the pressure swing amplitude increases, the capacity of the air dryer for regeneration also increases. The higher the pressure loss of compressed air in the venting direction, the higher the potential for absorption of moisture retained in the air dryer during regeneration of the air dryer. Moreover, it is possible to implement venting in a particularly efficient and/or relatively rapid way.

In the context of another embodiment, the compressed air supply installation furthermore has:
  a control valve,
  a pneumatic control line between the first pneumatic connection and the control valve,
  in particular, a pneumatic pilot operation line between the control valve and the non-return valve, wherein the non-return valve can be released by means of the control valve, using a pressure derived from the first pneumatic connection via the pneumatic control line, in particular, by pressurization of the pilot operation line.

In this embodiment, a control valve is provided in the compressed air supply installation for the purpose of releasing the pilot-operated non-return valve. The pneumatic control valve is advantageously designed as a directional control valve, in particular a 3/2-chamber directional control valve, in particular, as a solenoid valve. The pneumatic control line branching off from the first pneumatic connection, in particular, a main pneumatic line, can supply the control valve with pressure such that—when the control valve switches—the pressure is transmitted via a control line or the like, in particular, via the pneumatic pilot operation line, to a control chamber in order to release the non-return valve.

This construction is advantageous, in particular because the pneumatic control valve can be used not only to release the non-return valve but, in addition, also to activate a vent valve in the second pneumatic connection between the compressed air port and the vent port, as explained further below. This has the effect that, by means of a single control valve, the air dryer can be opened on both sides during venting and regeneration, namely, on the one hand, by releasing the non-return valve and, on the other hand, by opening the vent valve.

In a first variant, the vent valve can be formed separately from the non-return valve. As explained further below, it is possible in another variant for a vent valve to be embodied as a unit with the non-return valve. Particularly, in the last case, it is advantageous for the control valve to be arranged together with the unit in a compressed air supply installation.

With reference to both variants, advantageous design developments of the pilot-operated non-return valve are obtained as set forth below.

It is particularly advantageous if the non-return valve has, on the one hand:
  a shutoff chamber connected pneumatically to the first pneumatic connection,
  a through flow chamber connected pneumatically to the first pneumatic connection,
  a shutoff valve seat between the shutoff chamber and the through flow chamber, and
  a shutoff valve element, which shuts off the shutoff valve seat in the shutoff mode and opens the seat in the release mode.

In the release mode, a suitable restrictor for a compressed air flow is advantageously formed between the shutoff valve seat and the shutoff valve element.

On the other hand, it is advantageous if the pilot-operated non-return valve has a control chamber, which is connected pneumatically to the pneumatic pilot operation line, which is isolated pneumatically from the through flow chamber, and by means of which a control piston acting on the shutoff valve element can be actuated. It is advantageous if pressurization of the control chamber by means of compressed air or a similar pressure fluid triggers actuation of the control piston pneumatically. It is advantageous if the control piston is actuatable against a spring force. This has the advantage that, when the control chamber is not pressurized, it is not possible for the control piston to exert a switching action on the shutoff valve element, and/or the control piston is spaced apart from the shutoff valve element. To actuate the control piston, pressurization of the control chamber has to take place with a pressure amplitude sufficient to move the control piston against the spring force such that it can act on the shutoff valve element.

A pilot-operated non-return valve that is fundamentally known, e.g., from DE 42 34 626 C2, is improved especially as regards its attachment to the compressed air supply installation. As an embodiment of the compressed air supply installation, a control chamber of the non-return valve is divided pneumatically by means of a dividing seal arranged on the control piston into a control space connected pneumatically to the pneumatic pilot operation line and into a venting space connected pneumatically to the pneumatic pilot operation line. For this purpose, the control piston advantageously has an annular bead that carries the dividing seal. The annular bead preferably has a second side facing the venting space and a first side facing the control space, wherein a surface of the second side on the venting-space side is smaller than a surface of the first side on the control-space side. In other words, the annular bead advantageously has a larger pressurizable surface area on the side thereof facing the control space than on the side thereof facing the venting space.

In a first modification of the pneumatically pilot-operated non-return valve, the control chamber provides a venting space in addition to the control space, the venting space being used in addition for the accelerated actuation of the control piston by virtue of its pneumatic connection to the pneumatic pilot operation line. The control space of the control chamber can be connected pneumatically to the venting space of the control chamber, with the result that, when the control piston is actuated, the movement of the annular bead with the dividing seal results in compressed air contained in the venting space being fed to the control space—on a principle similar to that of communicating tubes—and, hence, the actuation of the control piston being accelerated through a differential force. This takes place insofar as the control space has a lower pressure level. This, in turn, can be ensured by means of the time sequence of the opening of the vent valve, since this initially lowers a pressure level in the through flow chamber.

In a second, likewise advantageous modification of the compressed air supply installation in respect of the pilot-operated non-return valve, a venting space of the control chamber is, in addition or as an alternative, connected pneumatically—directly or indirectly—to the second pneumatic connection or to the environment. In particular, a connection to the second pneumatic connection can be achieved by means of a pneumatic branch line between the control valve and the vent port. In this modification, the pilot-operated non-return valve is provided with a separate venting function based on the venting space connected via the control valve to the vent port.

Generally, it is advantageous that the compressed air supply installation has at least one controllable vent valve in the second pneumatic connection, the vent valve being separate or embodied as a unit with the non-return valve.

The foregoing embodiments of the pilot-operated non-return valve are suitable for incorporation into a compressed air supply installation that has a controllable vent valve that is formed separately from the pilot-operated non-return valve. Whether in the form of a separate vent valve or—as a preferred option for improved venting—as a unit with the non-return valve, it is advantageous that the controllable vent valve, as an indirectly switched relay valve, is part of a solenoid valve arrangement for indirect switching of a compressed air volume. In this case, the solenoid valve arrangement has a control valve for pneumatic control of the relay valve, which is subjected to a pressure derived from the first pneumatic connection via a pneumatic control line. A preferred embodiment of a compressed air supply installation that is implemented with a separate vent valve is shown in FIG. 1 to FIG. 4. The solenoid valve arrangement can be implemented in a relatively compact form. In a modification, the vent valve is formed as a unit with the isolating valve. Such embodiments of a compressed air supply installation are described in detail in FIG. 5A and FIG. 5B to FIG. 10. It should be understood that the present invention is not limited to the embodiment of the compressed air supply installation with a solenoid valve arrangement consisting of a controllable vent valve as an indirectly switched relay valve and of a control valve. On the contrary, the invention is also suitable, within the context of a controllable vent valve, as a directly switched valve that is part of a solenoid valve arrangement for direct switching of a compressed air volume. Such a solenoid valve arrangement is advantageously free from a control valve.

In one embodiment, a single valve or a plurality of valves of a solenoid valve arrangement, in particular, a primary valve and a secondary valve of a double-armature magnet magnet, can be provided as a vent valve. These can be arranged in parallel or in series, and can be open or closed when deenergized—in any desired combination. Series arrangement and parallel arrangement of the primary and secondary valves are suitable for a particularly flexible configuration of the switching time sequence of the primary and secondary valves. It is thereby advantageously possible to make available different nominal diameters for the vent line at different times. It is thereby possible to reduce pressure peaks during venting and, thus, to reduce acoustic phenomena, in particular, to avoid an explosive release of air. A parallel arrangement is additionally advantageous for a stepwise increase in the nominal diameters available for the vent line, thus allowing quick venting while nevertheless avoiding an explosive release of air.

Excessive acoustic phenomena or an explosive release of air are always a risk during a venting process if an excessively large compressed air volume is vented in too short a time, i.e., at too high a pressure amplitude. On the other hand, a relatively high pressure swing amplitude is desired for optimum regeneration of the air dryer. Increased efficiency as regards venting and dryer regeneration, on the one hand, and quiet operation, on the other hand, can thus have conflicting requirements. The invention achieves a particularly advantageous compromise between dryer regeneration and venting efficiency, on the one hand, and acoustic phenomena, on the other hand.

The foregoing embodiments furthermore offers the advantageous possibility, in principle, that the control valve of the solenoid valve arrangement and the control valve of the pneumatic control line are the same control valve. For this purpose, the control valve is arranged in the pneumatic control line and is designed for pneumatic control of a vent valve and/or of a non-return valve.

It is advantageous if the non-return valve has a venting chamber that can be connected pneumatically to the second pneumatic connection. For this purpose, a vent valve seat can be provided between the venting chamber and the second pneumatic connection, and a vent valve element can be provided, which shuts off the vent valve seat in the shutoff mode and opens the seat in the release mode. It is advantageous if the vent valve element is formed on the other side of a dividing seal of a control piston, in particular, integrally with the control piston.

The vent valve element can form an integral tappet with the control piston. The tappet preferably has a length that is less than a clearance between a vent valve seat of the venting chamber and a shutoff valve seat of the shutoff chamber. In this way, an acoustically preferred high-pressure venting function can be implemented in a compact way, a function that would otherwise have to be implemented by means of a supplementary separate high-pressure vent valve. Only when a pressure in the air dryer has fallen sufficiently after the opening of the vent valve seat and the opening of the inlet of the venting chamber is the force of the control piston sufficient to open the outlet at the shutoff valve seat in the non-return valve by raising the shutoff valve element from the shutoff valve seat. To achieve this, the length of the tappet is preferably greater than a clearance between the shutoff valve seat of the shutoff chamber and an inlet of the venting chamber.

It is possible to simultaneously open an air dryer on both sides in a release mode of the pilot-operated non-return valve—namely in a process involving the actuation of the control piston together with the vent valve element; namely, by opening the shutoff valve seat, on the one hand, and, on the other hand, by opening the vent valve seat.

When actuated, a control piston and vent valve element advantageously embodied as a unit, thus, on the one hand, open the vent valve formed as a unit with the isolating valve and, on the other hand, release the isolating valve designed as a non-return valve. This unit is not only compact, but, in addition, a separate relay valve function of a relay valve of the solenoid valve arrangement is advantageously integrated into the isolating valve.

With or without a vent valve, the pilot-operated non-return valve in this embodiment can be used to form suitable restrictor cross sections—both for a restrictor in the first pneumatic connection and for a restrictor in the second pneumatic connection. The control piston with its end facing the shutoff valve element by means of different cross sections offset stepwise relative to one another is particularly advantageous. Depending on the position of the control piston, it is thus possible, in the release mode, to achieve an effective nominal diameter in the shutoff valve seat that is dependent on the position of the control piston using one of the cross sections that are offset stepwise in one nominal diameter of the shutoff valve seat.

In addition or as an alternative, the shutoff chamber, the through flow chamber, the control chamber and/or the venting chamber of the pilot-operated non-return valve can have nominal inlet and outlet diameters that perform a restricting function for a compressed air flow.

The foregoing embodiments are especially suitable for the formation of a compressed air supply installation in the form of a device having a housing arrangement that has a number of zones. In a first housing zone, a drive can be formed and/or, in a second zone, an air compressor that can be driven by the drive can be formed, and/or, in a third zone connected to the second zone by a pressure-source interface, the air dryer and the isolating valve can be formed. In such a device, it is advantageous for the pneumatically pilot-operated non-return valve to be accommodated in the air dryer of the third zone. Arrangement of the control valve in a drying canister recess formed by a wall of the drying canister is advantageous. Moreover, the arrangement of the pneumatically pilot-operated non-return valve, especially as a unit with the vent valve, in a cap of the third zone of the housing arrangement is advantageous.

In a pneumatic system having the compressed air supply installation and a pneumatic installation, it is advantageous for the pneumatic installation to be in the form of an air spring installation that has a gallery and at least one branch line connected pneumatically to the gallery and at least one bellows and, optionally, a reservoir. It is advantageous if a directional control valve is arranged ahead of the bellows and, optionally, the reservoir. Especially in the context of a solenoid valve, a suitable design of the directional control valve is as a 2/2-way valve. In terms of construction, such directional control valves or other directional control valves can be implemented to particular advantage in a valve block having a plurality of valves.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in greater detail below using exemplary embodiments on the basis of the accompanying drawings, in which.

The same reference numerals are used herein for identical or similar parts or parts with an identical or similar function.

Figure 1:
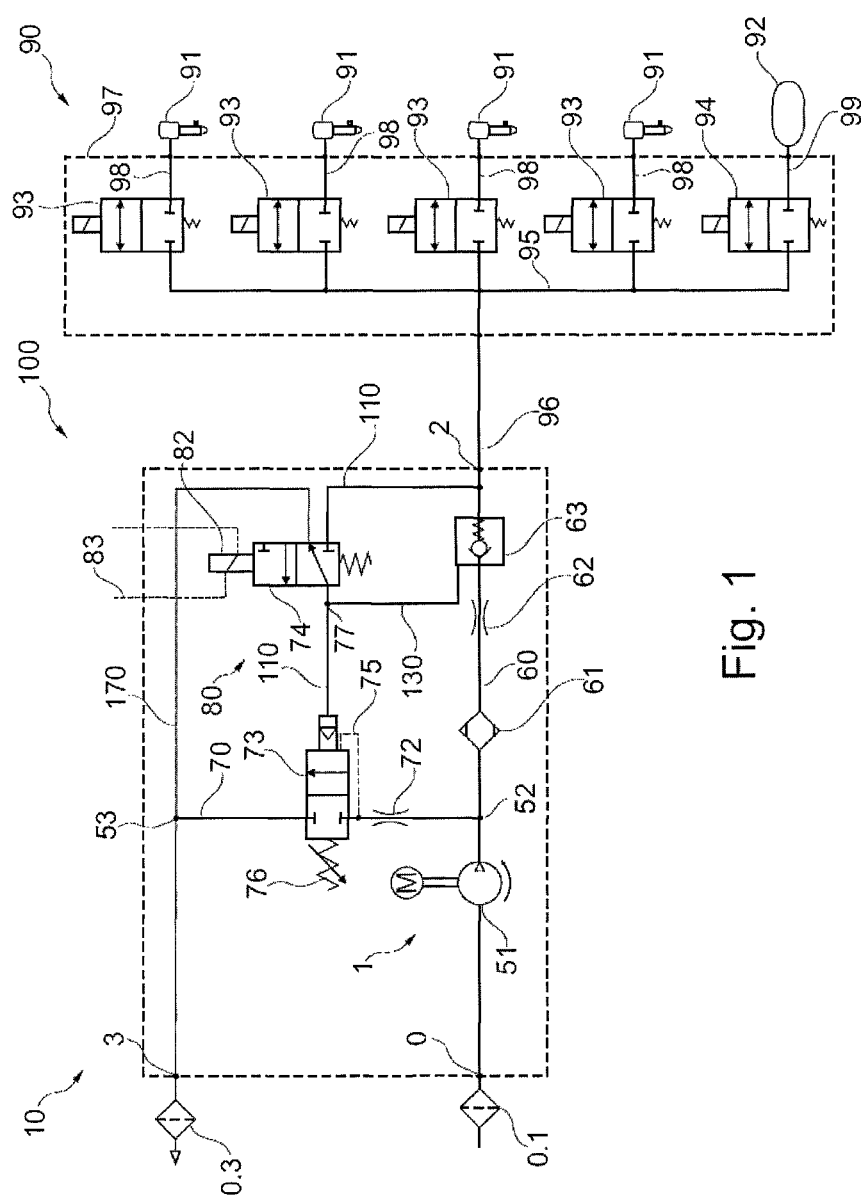
FIG. 1 is a circuit diagram of a pneumatic system having a compressed air supply installation according to an embodiment of the present invention, in which the vent valve, as an indirectly switched relay valve, is part of a solenoid valve arrangement for indirectly switching a compressed air volume in a vent line of a second pneumatic connection, and wherein the solenoid valve arrangement has a control valve exposed to a pressure in a first pneumatic connection, which is formed by a main pneumatic line, the control valve being used to control the relay valve and the pneumatically pilot-operated non-return valve.

LIST OF REFERENCE CHARACTERS 0 air feed
0.1 air filter
0.3 filter
1 compressed air feed
2 compressed air port
3 vent port
10, 11, 12, 20, 20', 20", 30 compressed air installation
51 air compressor
52 compressed air feed port
53 branch port
54 compression space
55 piston
56 connecting rod
57 outlet valve
58 drying canister
60 main pneumatic line
61 air dryer
62 first restrictor
63, 64 non-return valve
63' throttle check valve
70, 70' vent line
72 second restrictor
73 vent valve
74 control valve
74A valve seat
74B valve armature
74C valve seal
74D coil
74E valve spring
75 pressure limitation feature
76 adjustable spring of the vent valve
77 branch port
80 solenoid valve arrangement
82 coil
83 control line
90 pneumatic installation
91 bellows
92 reservoir
93 solenoid valve
94 solenoid valve
95 gallery
96 further pneumatic line
97 valve block
98 spring branch line
99 reservoir branch line
100, 200, 300 pneumatic system
110 pneumatic control line
130 pneumatic pilot operation line
130.1 first pilot operation branch line
130.2 second pilot operation branch line
170 further vent line
170.1 vent branch line
610 shutoff valve seat
620 shutoff valve element
621 seating surface
630 valve spring
640, 640' control piston, double relay piston
640.1 first portion
640.2 second portion
641, 641' abutment surface, relay release element
642 annular bead
642.1 first side of the annular bead 642, facing the control space
642.2 second side of the annular bead 642, facing the venting space
643 seating surface
644 control seat
650 housing
651 seal
652 dividing seal
653 seal
660 control spring
670 vent valve seat
680, 680' vent valve element, relay vent valve element
681 vent valve seal
A first housing zone
B second housing zone
C third housing zone
A0 inlet of the shutoff chamber I
A1 outlet A1 of the shutoff chamber I
A2 outlet of the through flow chamber II
A3 inlet of the venting chamber IV
A4 outlet of the venting chamber IV
D compressed air flow
ER venting direction
BR filling direction
E0 air feed interface
E1 compressed air feed interface
E2 compressed air supply interface
E3 venting interface
F spring
G recess
M motor
OB opening movement of the control piston 640
$P_S$ system or control pressure in the control space III.1
$P_R$ retention pressure in the gallery 95
S control interface
SB closing movement of the control piston 640
T cap
I shutoff chamber
II through flow chamber
III control chamber
III.1 control space
III.2 venting space
IV venting chamber

DETAILED DESCRIPTION OF THE PREFERRED EMBODIMENTS

FIG. 1 shows a pneumatic system 100 having a compressed air supply installation 10 and a pneumatic installation 90 in the form of an air spring installation. In this case, the air spring installation has a total of four "bellows" 91, which are each assigned to one wheel of a vehicle and form an air spring for the vehicle. Moreover, the air spring installation has a reservoir 92 for storing rapidly available compressed air for the bellows 91. Respective solenoid valves 93 are arranged ahead of the bellows 91 in respective spring branch lines 98, each of the valves serving as a level control valve for opening or closing an air spring formed by a bellows 91. The solenoid valves 93 in the spring branch lines 98 are designed as 2/2-way valves. A solenoid valve 94 in the form of a further 2/2-way valve is arranged as a reservoir valve ahead of a reservoir 92 in a reservoir branch line 99. The solenoid valves 93, 94 are connected by means of the spring and reservoir branch lines 98, 99 to a common header line, a pneumatic line forming a gallery line 95. The gallery 95 is connected pneumatically to a compressed air port 2 of the compressed air supply installation 10 by a further pneumatic line 96 to form a pneumatic connection. In the present case, the solenoid valves 93, 94 are arranged in a valve block 97 having five valves. In FIG. 1, the solenoid valves 93, 94 are shown in a deenergized state—the solenoid valves 93, 94 being designed as solenoid valves that are closed when deenergized. Other, modified embodiments can give a different arrangement of the solenoid valves 93, 94—and it is also possible for fewer solenoid valves to be used as part of the valve block.

In particular, a non-return valve described below as an isolating valve does not necessarily have to be arranged in the compressed air supply installation 10. It is also possible for an isolating valve to be arranged in the pneumatic installation 90, also as part of the valve block 97, for example. It is likewise possible for the pneumatic installation 90 to have a voltage/pressure sensor, which can be connected to the gallery 95 in an additional branch line, making it possible to measure a pressure in the gallery 95 of the pneumatic installation 90 by means of the voltage/pressure sensor.

The compressed air supply installation 10 is used to operate the pneumatic installation 90. For this purpose, the compressed air supply installation 10 has a compressed air feed 1 and a compressed air port 2 leading to the pneumatic installation 90. In the present case, the compressed air feed 1 is formed with an air feed 0, an air filter 0.1 arranged ahead of the air feed 0, an air compressor 51 arranged after the air feed 0 and driven by a motor, and a compressed air feed port 52—according to FIG. 9 in the form of a suitably designed air feed interface E0, for example.

In the present case, a first pneumatic connection is formed by a single main pneumatic line 60 between the compressed air feed 1 and the compressed air port 2, being connected, on the one hand, to the compressed air feed port 52 and, on the other hand, to the compressed air port 2 and the further pneumatic line 96 to form the pneumatic connection. An air dryer 61 and a first restrictor 62 having a predetermined first nominal diameter are arranged in the main pneumatic line 60. Also arranged in the main pneumatic line 60 is an isolating valve with a pneumatically pilot-operated non-return valve 63. In the present case, the pneumatically pilot-operated non-return valve 63 is arranged in a pneumatic series circuit with the restrictor 62 in the main pneumatic line 60, wherein the main pneumatic line 60 is the only pneumatic line of the first pneumatic connection. The series arrangement comprising the restrictor 62 and the pneumatically pilot-operated non-return valve 63 is thus arranged in the main pneumatic line 60 between the air dryer 61 and the compressed air port 2 leading to the pneumatic installation 90.

Furthermore, the compressed air supply installation 10 has a second pneumatic connection, namely the vent line 70, which is connected pneumatically to the main pneumatic line 60 and to a vent port 3 and a further filter 0.3 and/or a muffler. In the present case, the vent line 70 is connected to the main pneumatic line 60 at the compressed air feed port 52. A second restrictor 72 having a second nominal diameter greater than the first nominal diameter and a controllable vent valve 73 are arranged in the vent line 70 in the direction of the vent port 3. In the present case, the vent valve 73 arranged in the second pneumatic connection formed by the vent line 70 is designed as a 3/2-way valve separate from the pneumatically pilot-operated non-return valve 63.

As an indirectly switched relay valve, the controllable vent valve 73 is thus part of a solenoid valve arrangement 80 for indirectly switching a compressed air volume of the vent line 70 that can be filled from the main pneumatic line 60. In this case, the solenoid valve arrangement 80 has a control valve 74 in the form of a 3/2-way solenoid valve. The control valve 74 can be activated by means of a control signal in the form of a voltage and/or current signal transmissible via a control line 83 to the coil 82 of the control valve 74. Upon activation, the control valve 74 can be transferred from the deenergized closed position shown in FIG. 1 to a pneumatically opened position, in which a pressure derived from the main pneumatic line 60 via a pneumatic control line 110 is transmitted for pneumatic control of the controllable vent valve 73 as a relay valve. In the present case, the controllable vent valve 73 is additionally provided with a pressure limitation feature 75. The pressure limitation feature 75 picks off a pressure via a pneumatic control line ahead of the vent valve 73—in this specific instance, between the second restrictor 72 and the vent valve 73—and, if the pressure exceeds a threshold pressure, it raises the piston of the vent valve 73 from the valve seat against the force of an adjustable spring 76—that is, it brings the controllable vent valve 73 into the opened position even without activation by means of the control valve 74. In this way, a situation where an unwanted excessive pressure arises in the pneumatic system 100 is avoided.

In what is, in the present case, the closed state, the control valve 74 divides the control line 110 and is connected pneumatically via a further vent line 170 to the vent port 3. In other words, in the closed position of the control valve 74 shown in FIG. 1, a line segment of the control line 110 situated between the vent valve 73 and the control valve 74 and having the branch port 77 is connected to the further vent line 170 between the control valve 74 and the vent port 3. For this purpose, the further vent line 170 is connected to the vent line 70 at the further branch port 53, and, hence, the vent line 70 and the further vent line 170 are combined in a segment situated between the further branch port 53 and the vent port 3.

In the present case, the compressed air supply installation 10 furthermore has a pneumatic pilot operation line 130 between the control valve 74 and the non-return valve 63, which line is connected to the control line 110 at the branch port 77. Thus, upon application of a control pressure derived from the main pneumatic line 60 or from the further pneumatic line 96 via the pneumatic control line 110, the non-return valve 63 can be released by means of the control valve 74 by pressurization of the pneumatic pilot operation line 130—i.e., by transferring the control valve 74 to the opened state. It is particularly advantageous if the transfer of the control valve 74 to the opened state leads not only to the release of the pilot-operated non-return valve 63 but also—since the line segment of the pneumatic control line 110, which is situated between the control valve 74 and the vent valve 73, is also subjected to control pressure—to the transfer of the vent valve 73 from the closed position to an opened position. In other words, the control valve 74 of the solenoid valve arrangement 80 is used to activate the vent valve 73 provided separately from the non-return valve 63 and to activate the non-return valve 63. This leads to pneumatic opening of the air dryer 61 on both sides when the control valve 74 is transferred to the opened position. During operation, this further operating position that can be adopted by the compressed air supply installation 10 can be used to vent the pneumatic installation 90 and simultaneously to regenerate the air dryer 61. The operating position shown in FIG. 1 of the compressed air supply installation 10, involving flow through the non-return valve 63—in the present case shown in the passage position—is used especially for filling the pneumatic installation 90 via the main pneumatic line 60. For this purpose, the solenoid valves 93 arranged ahead of the bellows 91 and/or the solenoid valve 94 arranged ahead of the reservoir 22 is/are moved into an opened position. Nevertheless, an operating position of the pneumatic installation 90 in which it is decoupled from the compressed air supply installation 10 is possible in the closed position of the solenoid valves 93, 94 in the pneumatic installation 90—owing to the fact that the non-return valve 63 is not released in the present case. In other words, cross-connection of bellows 91 (e.g., in the off-road mode of a vehicle), filling of the bellows 91 from the reservoir 92 or pressure measurement in the pneumatic installation 90 can take place via the gallery 95 without the compressed air supply installation 10 being supplied with pressure. In particular, the air dryer 61 is protected from being supplied unnecessarily with compressed air by the fact that the non-return valve 63 is shut off in the direction from the compressed air port 2 to the compressed air feed 1 and that the control valve 74 is closed. Supplying the air dryer 61 with compressed air is not advantageous in every operating position of the pneumatic installation 90. It is advantageous for effective and rapid regeneration of the air dryer 61 if this takes place only in the case of venting of the pneumatic installation 90 with the non-return valve 63 released—i.e., in a venting direction from the compressed air port 2 to the compressed air feed port 52. For this purpose, the control valve 74 is moved into an opened switching position, with the result that the vent valve 73 opens and the non-return valve 63 is released. Venting of the pneumatic installation 90 can take place via the released non-return valve 63, the restrictor 62—with the air dryer 61 being regenerated—and via the second restrictor 72 and the opened vent valve 73 to the vent port 3.

Figure 2:
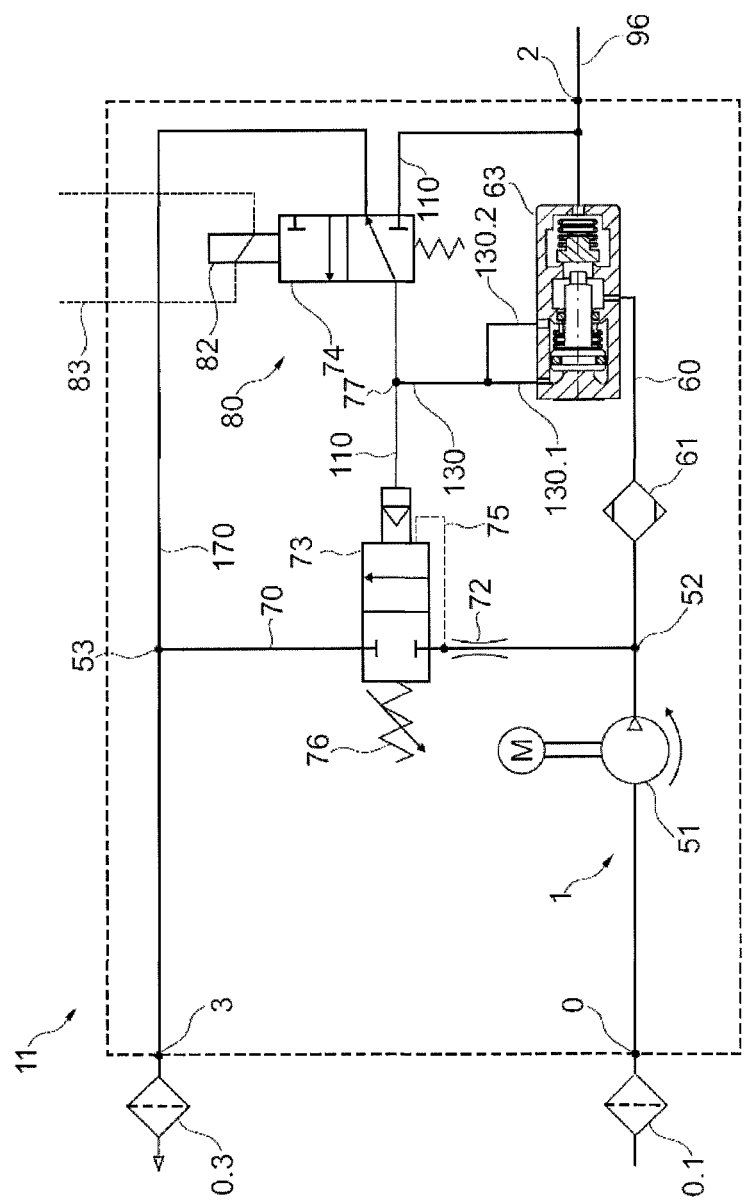
FIG. 2 is a circuit diagram of a pneumatic system having a modified embodiment of a compressed air supply installation, in which the pilot-operated non-return valve has a control chamber connected pneumatically to a pneumatic pilot operation line, wherein a control space and a venting space of the control chamber are connected for pneumatic communication.

FIG. 2 shows a compressed air supply installation 11 that is slightly modified in relation to FIG. 1. As a supplement to compressed air supply installation 10, the pneumatically pilot-operated non-return valve 63 in compressed air supply installation 11 is shown in a first preferred, structurally implemented embodiment, which is shown on an enlarged scale in a detail view in FIG. 4, a view which applies equally to FIG. 2 and FIG. 3. In order to describe the structurally implemented embodiment of the pneumatically pilot-operated non-return valve 63, reference will be made to FIG. 4 below. In the modified embodiment of compressed air supply installation 11—as already shown in FIG. 1—the pneumatically pilot-operated non-return valve 63 can be activated by the control valve 74 via a pneumatic pilot operation line 130. In this case, the pneumatic pilot operation line 130 is connected to the non-return valve 63 via a first pilot operation branch line 130.1 (the pneumatic pilot operation line 130 in FIG. 6) and a second pilot operation branch line 130.2 (the pneumatic vent branch line 170.1 in FIG. 6). As explained below, pilot operation branch lines 130.1 and 130.2 are connected to a control chamber of the non-return valve 63. The action thereof is explained by way of example below. To achieve this in the present case, the first pilot operation branch line 130.1 is connected to a control space III.1 of the control chamber, and the second pilot operation branch line 130.2 is connected to a venting space III.2 of the control chamber of the non-return valve 63.

The control piston 640 has an annular bead 642, which carries the dividing seal 652 and which has a second side 642.2 facing the venting space III.2 and a first side 642.1 facing the control space III.1. In this case, a pressurizable surface of the second side 642.2 on the venting-space side is smaller than a pressurizable surface of the first side 642.1 on the control-space side. In other words, the control space has a larger pressurizable surface of an annular bead 642 on a control piston than the venting space and is furthermore in pneumatically communicating connection with the venting space via pilot operation branch line 130.1 and pilot operation branch line 130.2. When the control piston 640 with the annular bead 642 moves, pneumatic actuation is boosted by the transfer of compressed air from the venting space III.2 to the control space III.1. This advantageously leads to an accelerated release process for the non-return valve 63. The magnitude of the acceleration depends on the ratios of the areas of the pressurizable surfaces on the annular bead 642 and possibly on the line cross sections on the control-space side relative to the venting-space side. Another embodiment which employs this advantageous principle will be explained with reference to FIG. 6E and FIG. 6F.

Figure 3:
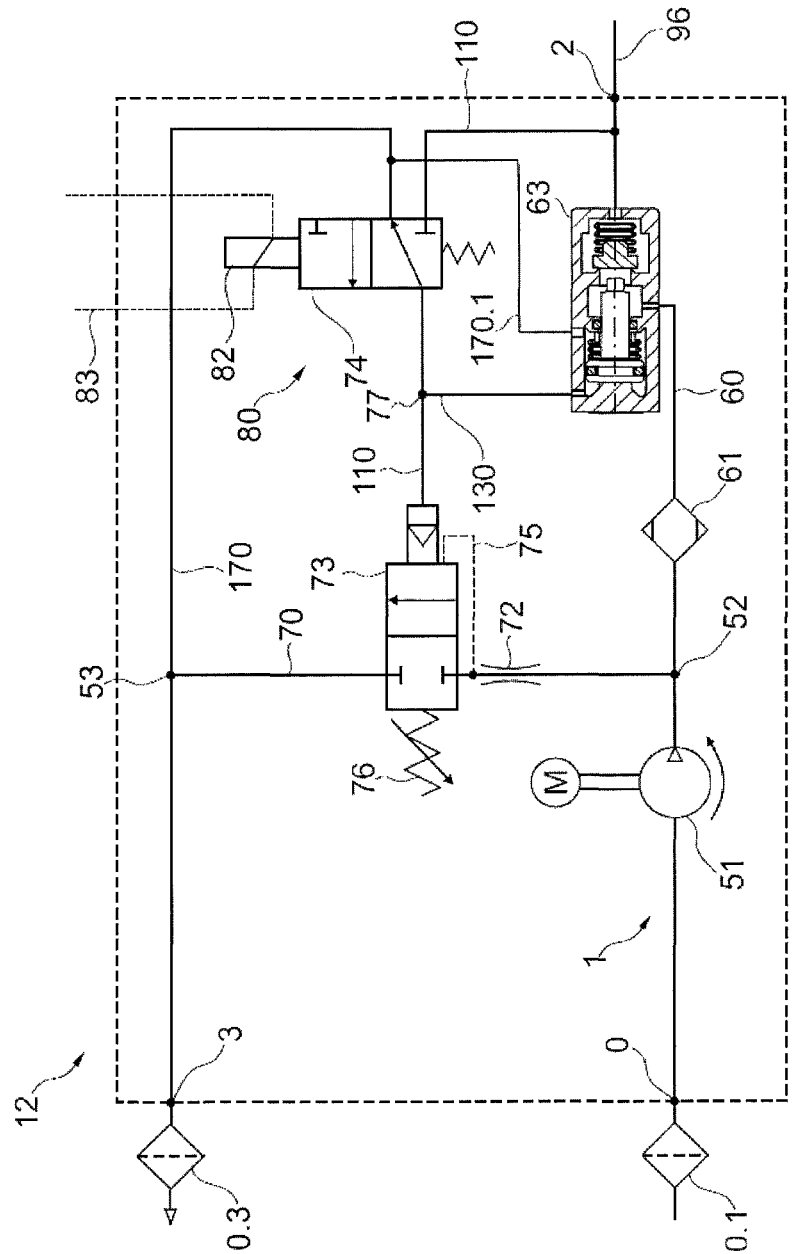
FIG. 3 is a circuit diagram of a pneumatic system having another modified embodiment of a compressed air supply installation, in which the pilot-operated non-return valve has a-control-chamber control space connected pneumatically to a pneumatic pilot operation line, and has a venting space of a control chamber of the non-return valve, the venting space being connected pneumatically to the vent line of the second pneumatic connection.

In a further-modified embodiment in FIG. 3, the compressed air supply installation 12, while being otherwise embodied in the same way as in FIG. 1 and FIG. 2, is provided with a non-return valve 63 that is, once again, connected pneumatically to the control valve 74 by a pilot operation line 130 (this time a single pilot operation line 130). For this purpose, the single pilot operation line 130 is connected pneumatically to the control chamber of the non-return valve 63—namely, in this particular case, to the control space of the control chamber. In the modified embodiment of the compressed air supply installation 12 in FIG. 3, in contrast, a venting space of the control chamber of the non-return valve 63 is connected pneumatically to the further vent line 170 by a vent branch line 170.1 and is connected pneumatically to the vent line 70 and, further on, to the vent port 3 by the further branch port 53. As an alternative, this vent branch line 170.1 can be connected directly to the environment. This measure results in different magnitudes of acceleration in comparison with the circuit shown in FIG. 2. Thus, FIG. 3 shows a modified compressed air supply installation 12, in which the pneumatically pilot-operated non-return valve 63 is connected to the vent port 3 by a separate vent line—namely, by the vent branch line 170.1 and the further vent line 170 and vent line 70. As is evident from FIG. 4, the modified embodiment of a compressed air supply installation 11 is designed for rapid actuation of a control piston of the non-return valve 63—using the pilot operation branch line 130.1, 130.2—since both pilot operation branch line 130.1 and pilot operation branch line 130.2 can be used to actuate a control piston of the non-return valve 63. In contrast, the modified embodiment of the compressed air supply installation 12 in FIG. 3 is particularly simple to implement since the venting space of a control chamber of the non-return valve 63 is kept at atmospheric pressure—i.e., open to the vent port 3—virtually at all times.

Figure 4:
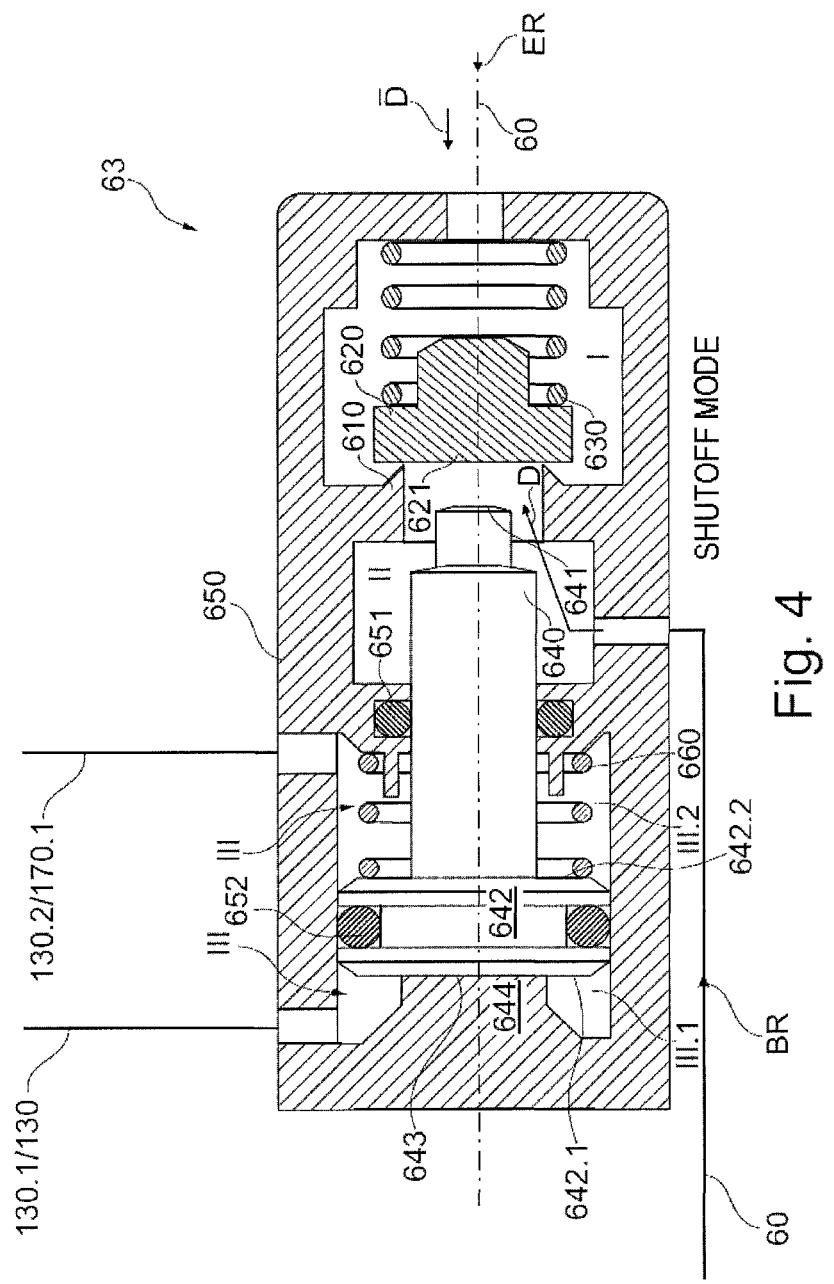
FIG. 4 shows a pneumatic non-return valve of the kind that can be used in the compressed air supply installations shown in FIG. 1 to FIG. 3.

FIG. 4 shows the pneumatically pilot-operated non-return valve 63 of FIG. 1, FIG. 2 and FIG. 3 on an enlarged scale and in detail.

On the one hand, the non-return valve 63 has a shutoff chamber I, which is connected pneumatically to the main pneumatic line 60, and a through flow chamber II, which can likewise be connected to the main pneumatic line 60. A shutoff valve seat 610 is provided between the shutoff chamber I and the through flow chamber II. A shutoff valve element 620, which closes off the shutoff valve seat 610 in the shutoff mode shown in the present case, is held on the shutoff valve seat 610 by a valve spring 630 designed as a compression spring. Fundamentally, therefore, the non-return valve 63 is held in a venting direction ER leading from the compressed air port 2 to the air dryer 61 in the shutoff mode, since a pressure of the pneumatic installation 90 presses on the shutoff valve element 620 and holds it on the shutoff valve seat 610 in addition to the valve spring 630.

In a filling direction BR from the air dryer 61 to the compressed air port 2, a compressed air flow D carried in the main pneumatic line 60 has only to overcome the counterpressure of the valve spring 630 in order to raise the shutoff valve element 620 from the shutoff valve seat 610. As a result, the through flow chamber II is connected pneumatically to the shutoff chamber I in the filling direction BR, thus allowing the full compressed air flow D to pass through the main pneumatic line 60 toward the pneumatic installation 90 in the filling direction BR.

The position of the non-return valve 63 shown in FIG. 4 for a shutoff mode can be canceled in a venting direction ER of a compressed air flow by pneumatic pilot operation of the non-return valve 63. Pneumatic pilot operation can be accomplished by actuating the control piston 640, which—being displaced to the right against a spring force of the spring 660 in FIG. 4—acts for this purpose on the shutoff valve element 620. The abutment surface 641 of the control piston 640 presses on the seating surface 621 of the shutoff valve element 620. In this way, the shutoff valve element 620 can be raised from the shutoff valve seat 610, with the result that the seat is opened by the shutoff valve element 620 in the release mode. In such a case, a compressed air flow I can flow through the shutoff chamber I and the through flow chamber II in the venting direction ER and can pass from the compressed air port 2 to the air dryer 61, regenerating the air dryer in the process.

For actuation of the control piston 640, the non-return valve 63 has a control chamber III connected pneumatically to the pneumatic pilot operation line 130, the chamber being pneumatically isolated from the through flow chamber II. Pneumatic isolation is provided by a seal 651 for the housing 650 of the non-return valve 63 with respect to the control piston 640. In the present case, the control chamber III of the non-return valve 63 is furthermore divided into a control space III.1 and a venting space III.2. The division is accomplished by means of a further, dividing seal 652 situated between the housing 650 and the control piston 640. In contrast to seal 651, which is mounted in a fixed manner in the housing 650, the dividing seal 652 is mounted in a recess in the control piston 640 and can move with the control piston 640 on the housing 650 in the region of the control chamber III. In other words, the dividing seal 652 is suitable for dividing the control chamber III pneumatically into a control space III.1 and a venting space III.2 in a variable and leaktight manner in every position of the control piston 640.

Referring to FIG. 2, the control space III.1 is connected pneumatically to the first pilot operation branch line 130.1, and the venting space III.2 is connected pneumatically to the second pilot operation branch line 130.2. Referring to FIG. 3, the control space III.1 is connected pneumatically to the single pilot operation line 130. The venting space III.2 is connected pneumatically to the vent branch line 170.1.

By supplying the control chamber III.1 with a control pressure from pilot operation branch line 130.1 or the single pilot operation line 130, the control piston 640 can be subjected to a pilot operation pressure. The pilot operation control pressure is suitable for raising the seating surface 643 of the control piston 640 from the control seat 644 and for moving the piston in the direction of the shutoff valve element 620 against the spring pressure of the control spring 660. Referring to FIG. 2, this movement is accelerated by additional pressurization of the first pilot operation branch line 130.1 by compressed air supplied from the venting space III.2 and the second pilot operation branch line 130.2. Referring to FIG. 3, the movement of the control piston 640 takes place against the atmospheric pressure applied to the venting space III.2 via the additional vent branch line 170.1.

Figure 5A:
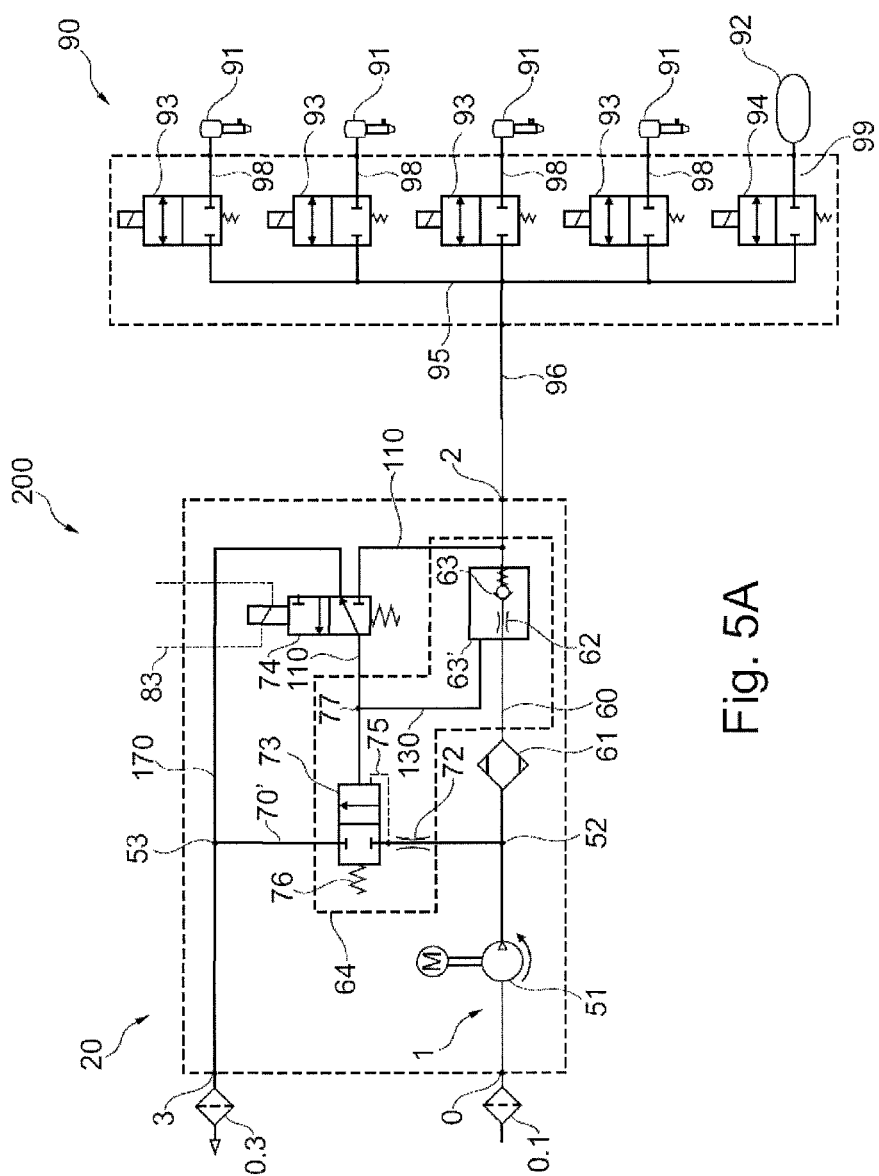
FIG. 5A is a circuit diagram of a pneumatic system having a compressed air supply installation in accordance with another embodiment of the present invention, in which the vent valve is formed in a second pneumatic connection designed as a vent line and is formed as a unit with the pilot-operated non-return valve in a first pneumatic connection designed as a main pneumatic line—by means of the same control valve, the non-return valve can be pneumatically pilot-operated while, at the same time, the vent valve can be opened by pneumatic pilot control.

FIG. 5A shows a circuit diagram, based on that illustrated in FIG. 1, of a pneumatic system 200 having a compressed air supply installation 20 in accordance with a second embodiment of the invention.

In the present case, the vent valve 73, the non-return valve 63 and the restrictor 62 are embodied as a unit namely, as a non-return valve 64 of the kind shown in various operating positions in the other figures, namely FIG. 6B, FIG. 6D, FIG. 6F, FIG. 7B and FIG. 8B, together with circuit diagrams in FIG. 6A, FIG. 6C, FIG. 6E, FIG. 7A and FIG. 8A of a compressed air supply installation 20. To be more specific, in the present case, the non-return valve 63 and the restrictor 62 are formed as a unit in the form of a throttle check valve 63'. The throttle check valve 63' is formed as a unit with the vent valve 73, which is designed as a relay valve. By means of the same control valve 74, the non-return valve 63 can be pneumatically released by the application of control pressure, while the vent valve 73 can be opened simultaneously by pneumatic pilot control. In the opened position of the control valve 74, a line segment of the control line 110, which lies between the vent valve 73 and the control valve 74 and has the branch port 77, is connected to the vent valve 73 in a manner that enables it to be supplied with control pressure. In the present case, a pneumatic pilot operation line 130 is also connected via the branch port 77 to the control line 110 between the control valve 74 and the non-return valve 63, allowing it to be supplied with control pressure. A control pressure in the control line 110 is applied to the non-return valve 63 and to the vent valve 73 and serves to release the non-return valve 63 and simultaneously to open the vent valve 73.

Figure 5B:
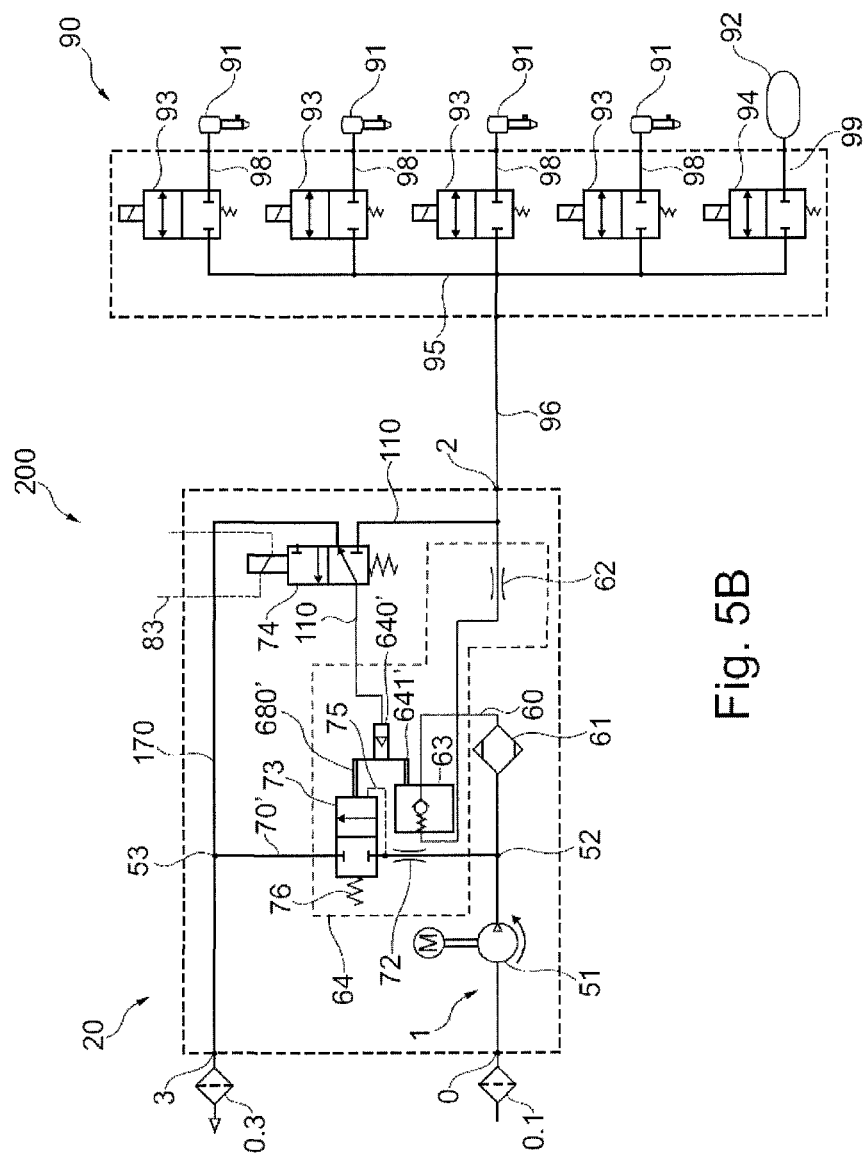
FIG. 5B is a circuit diagram of a modified pneumatic system similar to that shown in FIG. 5A, wherein actuation of the non-return valve to release tit and of the vent valve to open it is accomplished by a double relay piston controlled pneumatically by the control valve.

FIG. 5B shows a pneumatic system 200 that follows virtually the same principle as the pneumatic system 200 in FIG. 5A, and, therefore, this system and the other components are provided with the same reference signs. With slight modification—while nevertheless following the principle of the non-return valve 64 in FIG. 5A—FIG. 5B also shows a non-return valve 64, which is formed with a non-return valve 63 as one component as a unit with the restrictor 62 and the vent valve 73, which is designed as a relay valve. The routing of a pneumatic line 60 differs in the region of the non-return valve 63 from the routing of the pneumatic line 60 in FIG. 5A. In the present case, air flows first through the non-return valve 63, which opens automatically, and then through the restrictor 62 in the filling direction of the pneumatic installation 90; to this extent, the series arrangement of the non-return valve 63 and the restrictor 62 in the main pneumatic line 60 in FIG. 5B is different from that in FIG. 5A. In FIG. 5B, the non-return valve 63 and the restrictor 62 are arranged in the reverse sequence in the filling direction, using the same components as in FIG. 5A.

Moreover, a double relay piston 640', which can be activated pneumatically by the control valve 74 and is embodied as a control piston 640 in FIG. 6A to FIG. 9B, is provided for the simultaneous pilot operation of the non-return valve 63 and the opening actuation of the vent valve 73 in FIG. 5B. The control piston illustrated as a double relay piston 640' in FIG. 5B has a relay vent valve element 680', which is embodied in the following figures as a vent valve element 680. The double relay piston 640' also has a relay release element 641', which in the following figures is embodied as a first and a second portion 640.1, 640.2 with an abutment surface 641. To this extent, FIG. 5B represents symbolically the implementation in terms of circuitry of the structurally implemented embodiments described below. In the present case, the double relay piston 640' illustrates the principle involved in releasing the non-return valve 63 and simultaneously actuating the vent valve 73 by means of two actuating elements—namely, by means of relay release element 641' and relay vent valve element 680', which can be designed as integral elements or, in a first modification, as separate elements. As a preferred option—as shown symbolically in FIG. 5B and implemented structurally in the following figures—the actuating elements of the double relay piston 640' can be designed as integral regions of the double relay piston 640', namely, as relay vent valve element 680' and relay release element 641'. To this extent, the coupled embodiment of the actuating elements for the non-return valve 63 and the vent valve 73 in the integral embodiment of the control piston 640 is established.

Figure 6A:
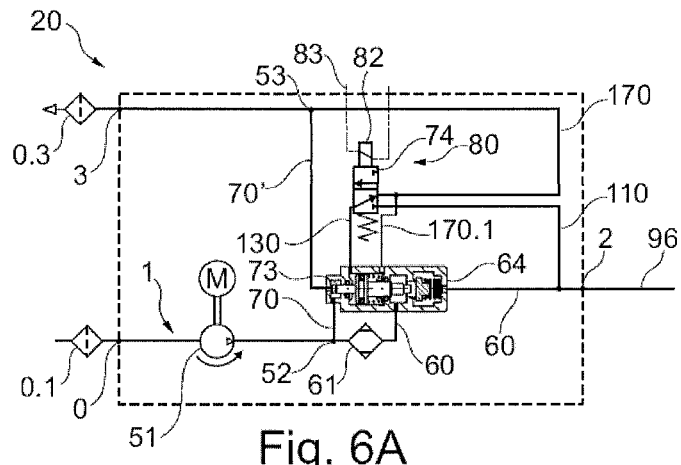
FIGS. 6A to 6F show a circuit diagram of a pneumatic system that is similar, in principle, to that shown in FIG. 5A and corresponds to that in FIG. 5B, wherein the pneumatically pilot-operated non-return valve is formed as a unit with a vent valve and wherein the non-return valve is shown in a shutoff mode—when the non-return valve is not released, the operating position in the shutoff mode is suitable for air transfer and/or pressure measurements in a gallery of the pneumatic installation; the pressurization of the control piston in the venting chamber, the pressurization modified in FIG. 6C and FIG. 6D as compared with FIG. 6A and FIG. 6B, affects the opening behavior of the non-return valve in an advantageous manner; the control space and the venting space, which are connected for communication in FIG. 6E and FIG. 6F, affect the venting behavior in an advantageous manner—all the embodiments are suitable for any desired combination with one another, either in their entirety or as parts.

FIG. 6A shows the compressed air supply installation 20 with control valve 74 operating and arranged in the manner already explained in principle with reference to FIG. 2, together with the second embodiment of a non-return valve 64 implemented as a unit comprising vent valve 73 and the throttle check valve 63' indicated in FIG. 5A. Owing to the second embodiment of the non-return valve 64, there is no need for a separate arrangement of the vent valve 73 in the vent line 70 as illustrated in FIG. 1 to FIG. 3. On the contrary—as explained with reference to FIG. 3—the control valve 74 is connected pneumatically to the non-return valve 64 by the pneumatic pilot operation line 130 and control space III.1 and by the further vent branch line 170.1 and venting space III.2. For a description of the non-return valve 64 as regards the operation of the shutoff chamber I, the through flow chamber II and the control chamber III, attention is drawn to the description of FIG. 4. The differences between non-return valve 64 and non-return valve 63 are explained below.

Figure 6B:
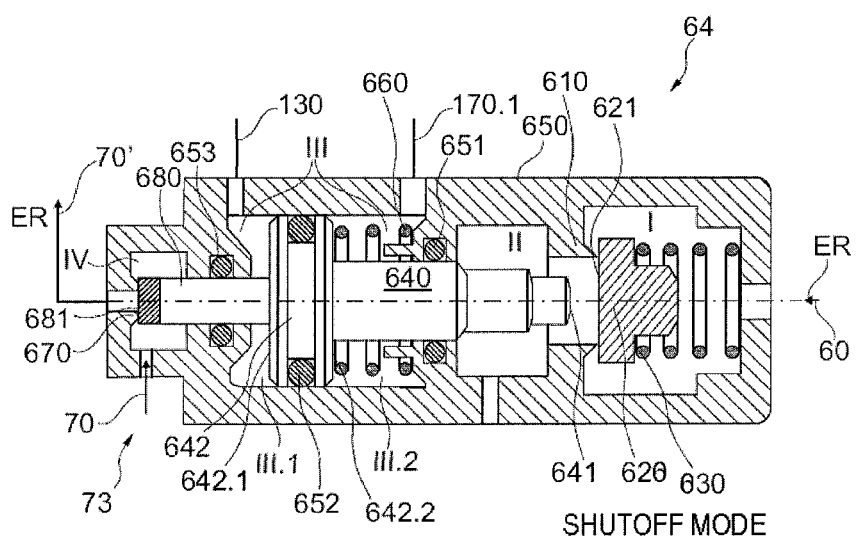

The pneumatically pilot-operated non-return valve 64 shown in FIG. 6A, which forms a unit with a controllable vent valve, is shown on an enlarged scale in FIG. 6B. FIG. 6B shows non-return valve 64 in the shutoff mode, i.e., in a functional position that is also adopted by the non-return valve 63 in FIG. 4 and that can be used, for example, for air transfer or pressure measurement in the gallery 96 of the pneumatic installation 90. In contrast and as an addition to the non-return valve 63 in FIG. 4, the non-return valve 64 in FIG. 6A has a venting chamber IV, which is connected pneumatically to the second pneumatic connection—in the present case, in the form of vent lines 70, 70'. For this purpose, the non-return valve 64 in FIG. 6A has a vent valve seat 670 between venting chamber IV and vent lines 70, 70'. In the present case, the dryer-side part of vent line 70 is connected above the venting element 680 of the venting chamber IV in venting direction ER, and the vent-side part of vent line 70' is connected below the venting element 680 of the venting chamber IV in the venting direction ER. The vent valve seat 670 is sealed off pneumatically in the shutoff mode by a vent valve element 680 formed integrally with the control piston 640. The vent valve element 680 has a vent valve seal 681, which strikes against the vent valve seat 670 by means of its seating surface and closes the pneumatic connection to vent line 70. Otherwise, the vent valve element 680—which is here formed integrally with the control piston 640—is sealed off by a further seal 653 formed in the housing 650 of the non-return valve. The venting chamber IV and the control chamber III—namely, the control space III.1 of the control chamber III and the venting chamber IV—are thus isolated or sealed off from one another. Nevertheless, the control space III.1 of the control chamber III and the venting chamber IV are virtually pneumatically coupled inasmuch as a movement of the control piston 640 also implies a movement of the vent valve element 680. This applies in a similar way to the virtual pneumatic coupling of the through flow chamber I and the venting space III.2 of the control chamber III, since a movement of the control piston 640 also implies a movement of those portions of the control piston 640 indicated in FIG. 7B in the outlet A1 of the through flow chamber II leading to the shutoff chamber I.

As already explained with reference to FIG. 4, a compressed air flow cannot pass through the non-return valve 64 in the venting direction ER in the shutoff mode since the shutoff valve element 620 is held on the shutoff valve seat 610 by virtue of the spring pressure of the valve spring 630 and of the pressure in the main pneumatic line 60 or the further pneumatic line 96.

The functional position of the non-return valve 64 in the shutoff mode, this position being shown in the present case, is suitable for the pneumatic decoupling of the compressed air supply installation 20 from the pneumatic installation 90. Air transfer or pressure measurement or cross-connection of the bellows 91 and/or the reservoir 92 can take place in the pneumatic installation 90 without subjecting an air dryer 61 of the compressed air supply installation 20 to the movement of compressed air.

Figure 6C:
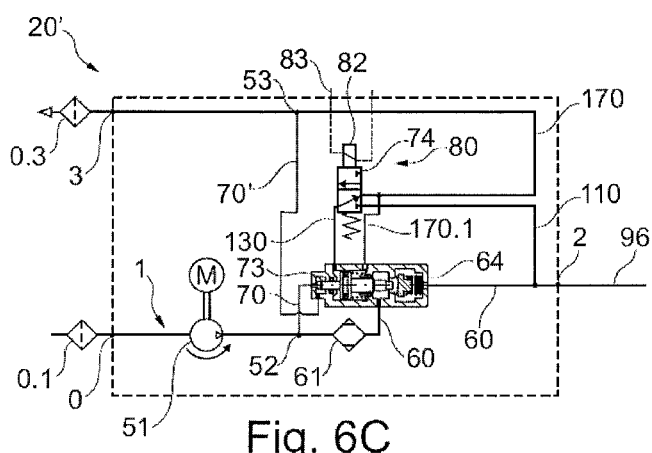
Figure 6D:
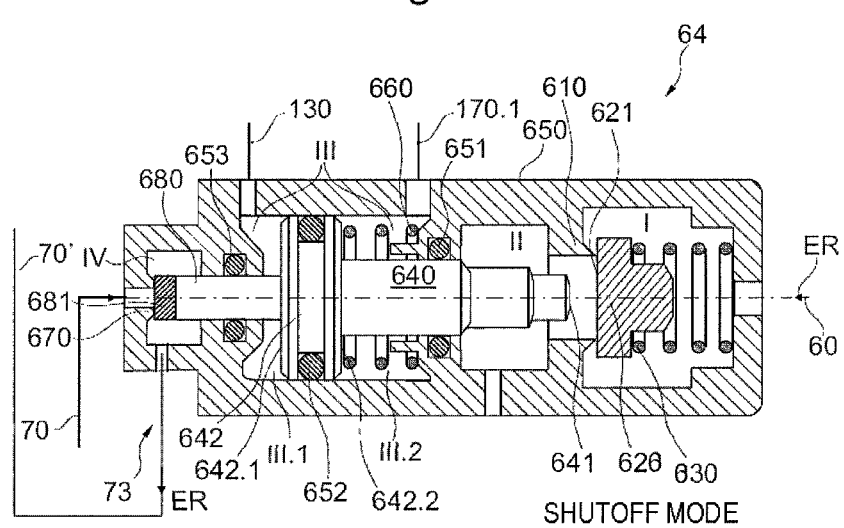

FIG. 6C to FIG. 6F show slightly modified embodiments of the embodiment of the pilot-operated non-return valve 64 in a compressed air supply installation 20, the latter embodiment having been explained in principle in connection with FIG. 6A to FIG. 6B. The embodiment of the non-return valve 64, which is virtually identical in construction, is therefore provided with the same reference signs in FIGS. 6D and 6F. However, the connection of the non-return valve 64 is different in comparison with that in the compressed air supply installation 20 shown in FIG. 6A. In this regard, FIG. 6C shows a compressed air supply installation 20' in which the connection of the venting chamber IV of the non-return valve 64 to the vent lines 70, 70' is reversed in comparison with compressed air supply installation 20. That is, in the present case, the dryer-side part of the vent line 70 is connected below the venting element 680 of the venting chamber in the venting direction ER, and the vent-side part of the vent line 70' is connected above the venting element 680 of the venting chamber IV in the venting direction ER. This leads to modified application of pressure to the control piston 640 in comparison with compressed air supply installation 20 since the venting element 680 connected to the control piston 640 is now subjected to a venting pressure in the venting direction ER on the underside and, thus, acts against the spring force of the control spring 660 in addition to a control pressure in the control chamber III. This has the effect that the control piston 640 can be opened merely by a venting pressure in the venting direction ER against the spring force of the control spring 660 at a predeterminable maximum pressure. Thus, by means of the compressed air supply installation 20' illustrated in FIG. 6C, with the connection of the non-return valve 64 described here and illustrated in detail in FIG. 6D, not only is the opening behavior of the valve influenced but, in addition, a pressure limiting function for the non-return valve 64 is implemented in a particularly advantageous way.

Figure 6E:
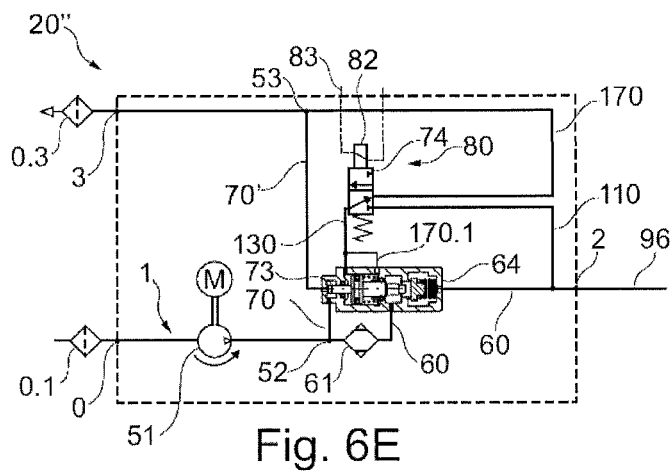
Figure 6F:
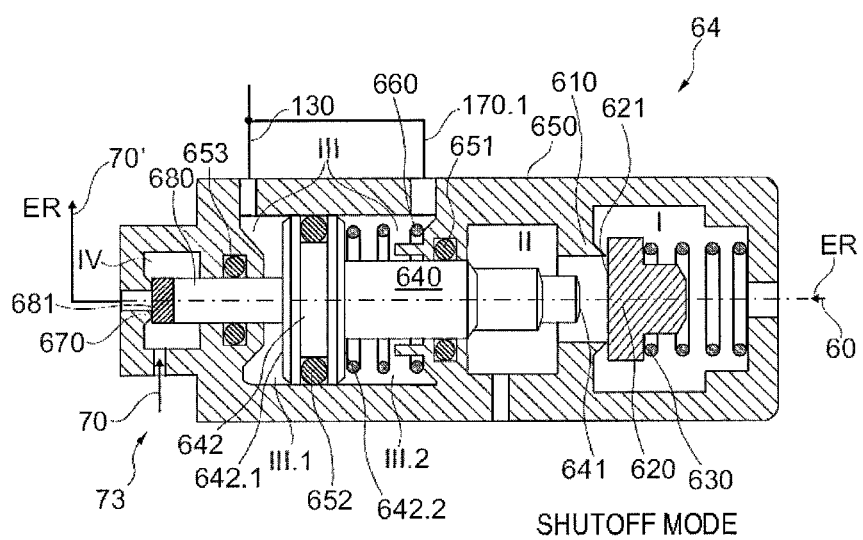

FIG. 6E shows a compressed air supply installation 20" in which the non-return valve 64 is connected in a manner similar to that shown in FIG. 2. In connection therewith, the non-return valve 64 is shown in detail in FIG. 6F with the connection of pneumatic pilot operation line 130 and the vent branch line 170.1 in contrast to FIG. 6B and FIG. 6A. Otherwise, the same reference signs relating to identical or similar features to those in FIG. 6A and FIG. 6B are used for the embodiment, which is implemented in an essentially identical way in other respects. In the present case, the pneumatic pilot operation line 130 is connected to the control space III.1 of the non-return valve 64. The vent branch line 170.1 previously referred to as such in FIG. 6A and FIG. 6B is once again connected to the venting space III.2 of the control chamber III—but it is now routed back to the pneumatic pilot operation line. As a modification of the embodiment in FIG. 6A and FIG. 6B, the control space III.1 and the venting space III.2 of the non-return valve in the compressed air supply installation 20" in FIG. 6E and FIG. 6F are thereby connected for pneumatic communication. This, in turn, advantageously leads to an accelerated release process for the non-return valve 64. The magnitude of the acceleration depends on the area ratios of the pressurizable areas on the annular bead 642 and, where applicable, on the line cross sections on the control-space side relative to the venting-space side since these affect the movement of the control piston 640 with the annular bead 642 while boosting pneumatic actuation by transferring compressed air from the venting space III.2 to the control space 11.1. In this embodiment, it is advantageous, on the one hand, that the vent branch line 170.1 can be kept relatively short or can simply be short-circuited with the pneumatic pilot operation line 130. Given the pressurization of the annular bead 642 from both sides in a manner that accelerates motion through feedback or transfer of compressed air, it is furthermore possible largely to dispense with a longer vent branch line 170.1.

Figure 7A:
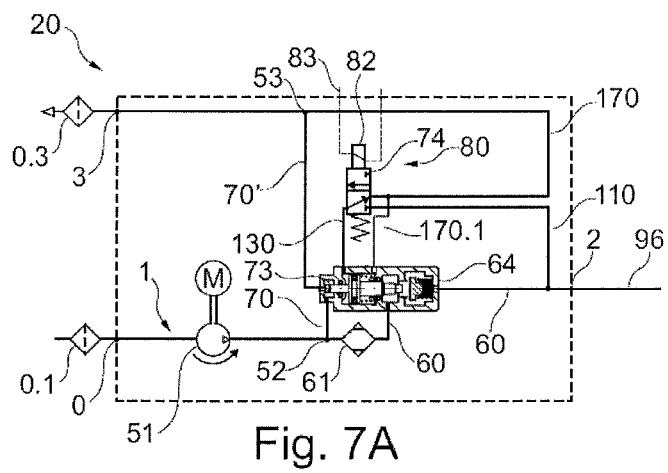
FIGS. 7A and 7B show a pneumatic system and a non-return valve as in FIG. 6, wherein the non-return valve is actuated in the filling direction (passage direction)—the operating position in the passage mode is suitable for filling the pneumatic installation from the compressed air feed when the compressor is running, for example.

FIG. 7A in conjunction with FIG. 7B once again shows the compressed air supply installation 20 with the non-return valve 64—this time in the through flow mode. As in FIG. 6A, the control valve 74 is in a closed position, and therefore the control piston 640 of the non-return valve 64 is not actuated. During the filling of the pneumatic installation 90 in the filling direction BR in the through flow mode of the non-return valve 64, the air compressor 51 is actuated by means of the motor M, thus enabling the compressed air feed 1 to deliver a compressed air flow D to the pneumatic installation 90 via the compressed air feed port 52 and the air dryer 61, via the main pneumatic line 60 in the passage direction of the non-return valve 64 and via the compressed air port 2. In this case, the compressed air flow D builds up a pressure against the shutoff valve element 620 or against the seating surface 621 thereof in the through flow chamber II, this pressure being sufficient to overcome the pressure force of the valve spring 630, thus raising the shutoff valve element 620 from the shutoff valve seat 610. As a result, the path for the compressed air flow D from the through flow chamber II to the shutoff chamber I etc. into the main pneumatic line 60 to the compressed air port 2 is opened. The control piston 640 is once again not actuated and retains the position thereof already illustrated in FIG. 6B. In other respects, the operation of the non-return valve 64 in FIG. 6B and FIG. 7B (shutoff mode and through flow mode, respectively) corresponds substantially to the shutoff mode and through flow mode of the non-return valve 63 explained with reference to FIG. 4.

Figure 8A:
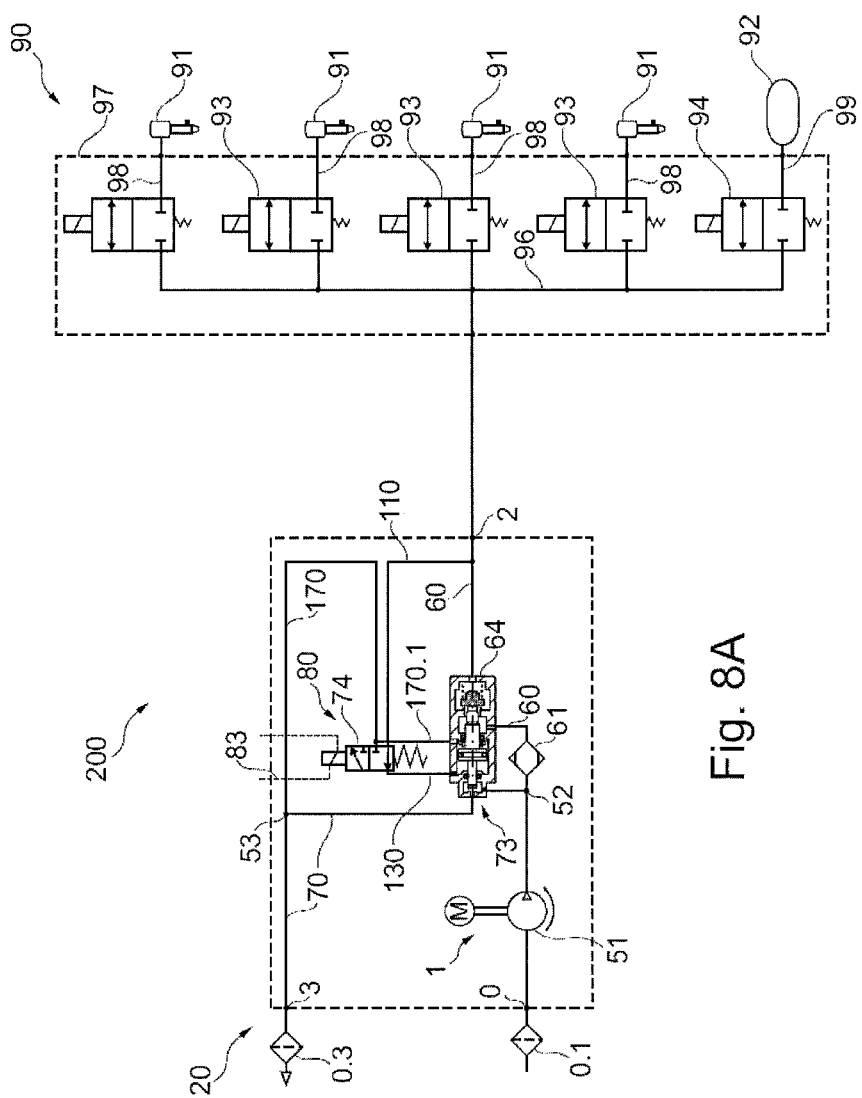
FIGS. 8A and 8B show a pneumatic system and a non-return valve as in FIG. 6 and FIG. 7, wherein the non-return valve is in a venting mode relative to the compressed air feed and a shutoff mode relative to the gallery (high-pressure venting mode), that is, wherein the shutoff valve element has not yet be actuated by the control piston, with the result that the non-return valve shuts off flow in the venting direction (shutoff direction) but the vent valve is nevertheless open—this operating position of the control piston for high-pressure venting exhibits particularly advantageous suitability for venting the compressed air supply installation.

In contrast to FIG. 1 to FIG. 4, FIG. 8A and FIG. 8B show the compressed air supply installation 20 and the associated non-return valve 64 in a high-pressure venting mode. According to the pressure characteristics, this initially forms an intermediate position with respect to a completely opened and released non-return valve; i.e., here, the intermediate position is first of all reached and explained for an opening movement OB of the control piston 640. However, the selective use thereof can define the entire range of application of the compressed air supply installation 20 with the non-return valve 64, especially in the position shown in FIG. 8B. Referring to FIG. 8A, the control valve 74 in the compressed air supply installation 20 is switched to an opened state for this purpose. As a result, the pressure available from the main pneumatic line 60 via the pneumatic control line 110 is transmitted to the pilot-operated non-return valve 64—more specifically, to the control space III.1 of the control chamber III—via the control valve 74 and the pilot operation line 130 and, thus, actuates the control piston 640 in the direction of the shutoff valve element 620, but without actuating the shutoff valve element per se, i.e., the shutoff valve element 620 remains on the shutoff valve seat 610 and closes the outlet A1. Owing to the integral construction of the control piston 640 with the vent valve element 680, however, the vent valve element 680 is actuated, i.e., the vent valve seal 681 is raised from the vent valve seat 680, and the outlet A4 of the venting chamber VI is opened. As a result, the non-return valve 64 is not yet released but the vent valve 73 formed as a unit with the non-return valve 64 is already opened due to the opening both of the outlet A4 shown in FIG. 8B and of the inlet A3 of the venting chamber VI in the venting direction ER. More specifically, the stop of the abutment surface 641 of the control piston 640 is not yet against the seating surface 621 of the shutoff valve element 620, but the vent valve seal 681 is already at a distance from the vent valve seat 670 and, advantageously, on the far side of the inlet A3 of the venting chamber IV. The shutoff valve element 620 is still held on the shutoff valve seat 610 by the pressure force of the valve spring 630. The vent valve seal 681 of the vent valve element 680 is raised from the vent valve seat 670 and, thus, opens the way for a compressed air flow D in venting direction ER out of the dryer 61 and, where applicable, the compressed air feed 52 from the inlet A3 (compressed air feed interface E1) via the venting chamber IV to the outlet A4 (vent interface E3) of the non-return valve 64.

The compressed air flow D then passes from the outlet A4 to the vent port 3 via the vent line 70, as shown in FIG. 8A. In this case, therefore, the air dryer 61 is already slightly open toward the vent port 3 via the compressed air feed port 52, whereas the control piston 640 in the non-return valve 64 is at most only (almost) resting against the seating surface 621 of the shutoff valve element 620, i.e., the gallery 96 is only just still closed by the non-return valve 64; thus—in contrast to the position shown in FIG. 9B—the non-return valve 64 is not yet open.

This results in an acoustically preferred high-pressure venting function, which would otherwise have to be implemented by means of a separate supplementary high-pressure vent valve. Only when the pressure in the dryer 61 has fallen far enough is the force of the control piston 640 sufficient likewise to open outlet A1 in the non-return valve 64 by a process in which the control piston 640 raises the shutoff valve element 620 from the shutoff valve seat 610. This time sequence can be achieved through selective design of the forces, areas and strokes in the non-return valve 64.

The present non-return valve 64 with control piston 640 as a valve assembly with a vent valve element 680 of the vent valve 73 is already well suited for this purpose. In this case, provision is made for the vent valve element 680 to form an integral tappet with the control piston 640, the length of which is less than a distance between a vent valve seat 670 of the venting chamber IV and a shutoff valve seat 610 of the shutoff chamber I and greater than a distance between the shutoff valve seat 610 of the shutoff chamber I and an inlet A3 of the venting chamber IV.

It is advantageous if only undried air in the dryer 61 is released in the high-pressure venting position until the force of the control piston 640 is sufficient to push open the non-return valve 64 and the opening toward the gallery 96. Thus, the end of a reservoir filling operation is, to a large extent, acoustically optimized without additional outlay on circuitry since the internal pressure in the dryer controls the more or less noisy venting thereof itself.

For normal venting operations with a virtually empty air dryer 61 and pressure in the gallery 96, e.g., from the bellows 91, on the other hand, there are no restrictions. Combined with a vent valve that opens when deenergized, this is a particularly simple modification that can also be implemented with a wide range of nominal diameters for outlets A1 and A4—e.g., between 0.8 . . . 4.0 mm. A particularly attractive aspect is that both variants—a vent valve 73, which is closed or one which is open when deenergized—are based on a largely coupled movement of the control piston 640 and the vent valve element 680, with a positive effect on the acoustics.

Figure 9A:
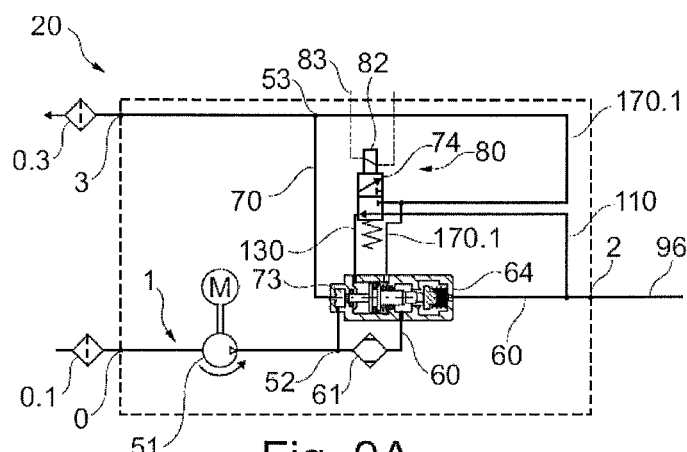
FIGS. 9A and 9B show a pneumatic system and a non-return valve as in FIG. 6A, FIG. 6B, FIG. 7A, FIG. 7B, FIG. 8A and FIG. 8B, wherein the non-return valve is in a release mode, that is, wherein the shutoff valve element has been actuated by the control piston, with the result that the non-return valve and the vent valve are open in the venting direction (shutoff direction)—this operating position in the release mode is suitable for venting the pneumatic installation and regenerating the air dryer.

In contrast to FIG. 1 to FIG. 4, FIG. 9A and FIG. 9B likewise show the compressed air supply installation 20 and the associated non-return valve 64 in a release mode, which comes after the high-pressure venting mode just described. Referring to FIG. 9A, the control valve 74 in the compressed air supply installation 20 is switched to an opened state for this purpose. As a result, the pressure available from the main pneumatic line 60 via the pneumatic control line 110 is transmitted to the pilot-operated non-return valve 64—more specifically, to the control space III.1 of the control chamber III—via the control valve 74 and the pilot operation line 130 and, thus, actuates the control piston 640 in the direction of the shutoff valve element 620. Owing to the integral construction of the control piston 640 with the vent valve element 680, the vent valve element 680 is also actuated, i.e., the vent valve seal 681 is raised from the vent valve seat 680.

As a result, on the one hand, the non-return valve 64 is mechanically released and, at the same time, the vent valve 73 formed as a unit with the non-return valve 64 is opened. More specifically, this purpose is served, on the one hand, by the abutment surface 641 of the control piston 640 striking against the seating surface 621 of the shutoff valve element 620 and thereby raising the shutoff valve element 620 from the shutoff valve seat 610 against the pressure force of the valve spring 630. That is, the control piston 640 acts directly in a mechanical way on the shutoff valve element 620 and raises it from the shutoff valve seat 610 of the non-return valve 64. In principle, some other movement of the control piston 640 that is expedient according to the requirements is furthermore also suitable for raising the shutoff valve element 620 directly or indirectly from the shutoff valve seat 610 of the non-return valve 64.

For this case of a release mode, the pilot-operated non-return valve 64 is released mechanically; namely, on the basis of the direct mechanical action or direct impact of the abutment surface 641 of the control piston 640 on the control valve element 620. Here, actuation of the control piston 640 is performed pneumatically via the control valve 74.

For this purpose, that side 642.2 of the annular bead 642 that faces the venting space can be made to strike against a stop in the housing 650 by the control spring 660. A compressed air flow $\overline{D}$ coming from the compressed air port 2 and the pneumatic installation 90 in the venting direction ER can, thus, flow in the manner indicated by arrows and—in a manner similar to that explained with reference to FIG. 4—through the shutoff chamber I and the through flow chamber II, which is now connected pneumatically to the shutoff chamber I. Moreover, the compressed air flow $\overline{D}$ flows onward via the main pneumatic line 60 to the air dryer 61. As shown in the present case in FIG. 7B—the main pneumatic line 60 can be formed with cross sections of an inlet A0 of the shutoff chamber I, the inlet serving as a restrictor 62 in FIG. 1, and, in particular, of an outlet A1 of the shutoff chamber I at the shutoff valve seat 610 and of an outlet A2 of the through flow chamber II. That is, the inlets and outlets A0, A1, A2 can be used to implement a restrictor 62 shown by way of example in FIG. 1 and FIG. 2.

Moreover, the vent valve seal 681 of the vent valve element 680 is raised from the vent valve seat 670 and, thus, opens the way for the compressed air flow $\overline{D}$ in venting direction ER from the compressed air feed interface E1 (inlet A3 in FIG. 8B) via the venting chamber IV toward the vent interface E3 (outlet A4 in FIG. 8B) of the non-return valve 64. The compressed air flow $\overline{D}$ passes from the vent interface E3 (outlet A4) to the vent port 3 via the vent line 70, as shown in FIG. 9A.

Figure 7B:
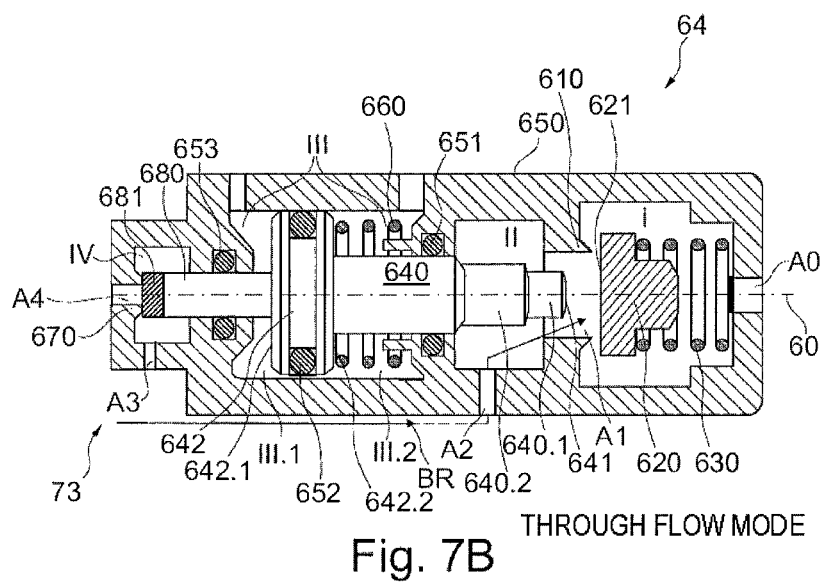
Figure 9B:
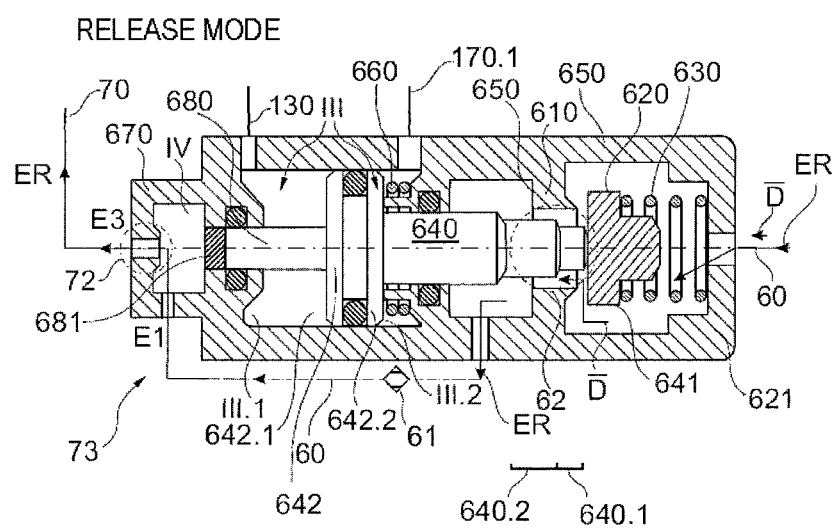

From the detail view in FIG. 9B, it can be seen that the first restrictor 62 and the second restrictor 72, as illustrated symbolically in FIG. 5A and FIG. 5B, are implemented by suitable nominal diameters of the vent interface E3 (outlet A4) in the non-return valve 64 forming a unit with a vent valve 73 shown in FIG. 9B. In this case, the nominal diameter of the shutoff valve seat 610 on the housing 650, in the passage between the through flow chamber II and the shutoff chamber i, the diameter being reduced by the cross section of the control piston 640, determines the nominal diameter of the first restrictor 62, which is indicated by the circle in FIG. 9B. The nominal diameter of the second restrictor 72 shown in FIG. 1 and FIG. 2 is determined by the nominal diameter of the vent interface E3 (outlet A4) at the outlet of the venting chamber IV. In the present case—in particular, in contrast to the control piston 640 in FIG. 4—an abutment surface 641 of the control piston 640 in the non-return valve 64 is advantageously of stepped design. For this purpose—as can be seen in FIG. 7B—the control piston 640 has a distal first portion 640.1 and a proximal second portion 640.2 on the side thereof facing the shutoff valve element 620, wherein the cross-sectional area of the first portion 640.1 is smaller than the cross-sectional area of the second portion 640.2. This has the effect that, in the case of full deflection of the control piston 640, the cross-sectional area of the second portion 640.2 determines the nominal diameter of the outlet A1 at the transition between the shutoff chamber I and the through flow chamber II—i.e., leads to a relatively narrow restrictor nominal diameter of the restrictor 62. In the case of only partial deflection of the control piston 640, in contrast, only the relatively small cross section of the first portion 640.1 takes effect, restricting the nominal diameter of the outlet A1 between the shutoff chamber I and the through flow chamber II. This has the effect that, in the case of only partial deflection of the control piston 640, the nominal diameter of the first restrictor 62 is greater than in the case of full deflection of the control piston 640. As a result, the—in the present case—stepped abutment surface 641 of the control piston with a stepped cross section leads to a restrictor nominal diameter of the first restrictor 62, which can be adjusted in steps. Using the input of a control pressure via the pilot operation line 130 in combination with venting via the vent branch line 170.1, this design of the control piston 640 can be used to set a favorable pressure swing amplitude for the regeneration of the air dryer 61 via the restrictor nominal diameter, that is, to set a pressure level in the compressed air flow $\overline{D}$ in the venting direction ER, which is advantageously low for the absorption of moisture from the air dryer 61. A further significant advantage of the stepped cross-sectional areas that can be achieved with the first and second portions 640.1 and 640.2 consists in the fact that a relatively large unrestricted cross section is available at the outlet A1 in the through flow mode—i.e., delivery of compressed air in the filling direction BR with the control piston 640 unactuated. This position of the compressed air supply installation can be used, for example, for emptying the gallery 96 and the compressed air supply installation 20 after the filling of the bellows 91 and/or of the reservoir 92.

Significantly improved regeneration of the air dryer 61 is also obtained in the context of the time sequence during the closing of the non-return valve formed, inter alia, by means of the shutoff valve seat 610, the shutoff valve element 620 and the valve spring 630, this effect being obtained, for example, after the filling of the bellows 91 and/or of the reservoir 92. A significant effect obtained here is a residual pressure holding function brought about by means of the control piston 640 spring-loaded by the control spring 660, since the control spring 660 acts on the second side 642.2 of the annular bead 642, that facing the venting space III.2, and, thus, the control piston 640 in equilibrium by virtue of the spring-loaded annular bead 642 with respect to a system or control pressure $P_S$ in the control space III.1 of the control chamber III, i.e., with respect to a retention pressure $P_R$ in the gallery 95. The system or control pressure $P_S$ is available in the control space III.1—as shown, for example, in FIG. 6C and FIG. 6F—via a pneumatic control line 110 branching off from the main pneumatic line 60 and is furthermore applied to the control space III.1 of the control chamber 111 via the pneumatic pilot operation line 130.

By means of the high-pressure venting function for venting the air dryer 61, the function having been explained in connection with FIG. 8A and FIG. 8B, the dryer outlet of the air dryer 61 on the side of the vent line 70 or of the compressed air feed port 52 is opened first in the venting direction ER during the opening of the non-return valve formed by means of the shutoff valve seat 610, the shutoff valve element 620 and the valve spring 630, before the non-return valve opens, i.e., before the shutoff valve element 620 is raised from the shutoff valve seat 610. During the high-pressure venting function, undried air in the air dryer 61 is released first, and then the non-return valve is pushed open in order to open the gallery 96 to allow further compressed air to be released from the system.

Conversely, the closing of the non-return valve formed by means of the shutoff valve seat 610, the shutoff valve element 620 and the valve spring 630 is also subject to a time sequence resulting from the dimensions of the vent valve element 680 and of the control piston 640 in interaction with the system or control pressure $P_S$. The closing of the non-return valve takes place as a result of a pressure drop in the system, that is, also in the gallery 96. As a consequence, the non-return valve closes first (i.e., the shutoff valve element 620 lands on the shutoff valve seat 610) and only then does the vent valve 73 close (i.e., the vent valve element 680 lands on the vent valve seat 670). Between the landing of the shutoff valve element 620 and the landing of the vent valve element 680, there is a period of time characterized, on the one hand, by the fact that the system pressure $P_S$, i.e., the pressure in the gallery 95, remains substantially at one level and, on the other hand, by the fact that the air dryer 61 can be completely emptied toward the dryer outlet, i.e., in the direction of the vent line 70. Owing to the temporarily stagnating system pressure when the non-return valve is closed, the system or control pressure $P_S$ remains largely unchanged in the control line 110 and the control space III.1 and is within the range of the residual pressure or retention pressure $P_R$ brought about by the control spring 660. Thus, the vent valve 73 is held open for a relatively long time, i.e., the vent valve element 680 is at a distance from the vent valve seat 670 for a certain, relatively long period of time. The non-return valve 64 now assumes the sealing function with respect to the gallery 96, and the inlet of the air dryer 61, i.e., the inlet of the air dryer 61 with respect to the through flow chamber II or gallery 96, is first closed. This has the advantage that all the available air can be used to regenerate the air dryer 61. Fundamentally, this results in improved regeneration of the air dryer 61. Improved regeneration is also fully effective even when the system or control pressure $P_S$ from the gallery 96 to the control space III.1 is low. A further contribution to this is also made by the staggering of the first and second portions 640.1, 640.2 on the control piston 640, with the result that, during the closing of the non-return valve formed by means of the shutoff valve seat 610, the shutoff valve element 620 and the valve spring 630, a relatively small nominal diameter is set for the compressed air flow $\overline{D}$ in venting direction ER, this being intended to make available to the air dryer 61 an advantageously low pressure level for the absorption of moisture from the air dryer 61. That is, the improved regeneration as a result of the residual pressure holding function is also achieved in the case of relatively low pilot control pressures in the control line 110. This is generally the case with low bellows pressures, i.e., at pressures close to the retention pressure $P_R$, which corresponds to a residual pressure that is counteracted by the mechanical force of the control spring 660. There is thus no longer a risk of inadequate regeneration, even at relatively low control pressures, in contrast to the prior art.

The complete emptying of the air dryer 61 when the non-return valve is already closed and the vent valve 73 is still open in the venting direction ER has the effect that the air dryer 61 is completely emptied. An empty air dryer 61 is fundamentally advantageous for enabling a relatively short and quiet startup of an air compressor 51, e.g., a compressor of the compressed air supply installation 10, 11, 12, 20, 20', 20", 30. A pressure-free startup of this kind is always guaranteed in the present embodiment, irrespective of measures in the gallery 96, since the non-return valve 64 formed by means of the shutoff valve seat 610, the shutoff valve element 620 and the valve spring 630 is seated as a sealing element between the air dryer 61 and the gallery 96.

Figure 8B:
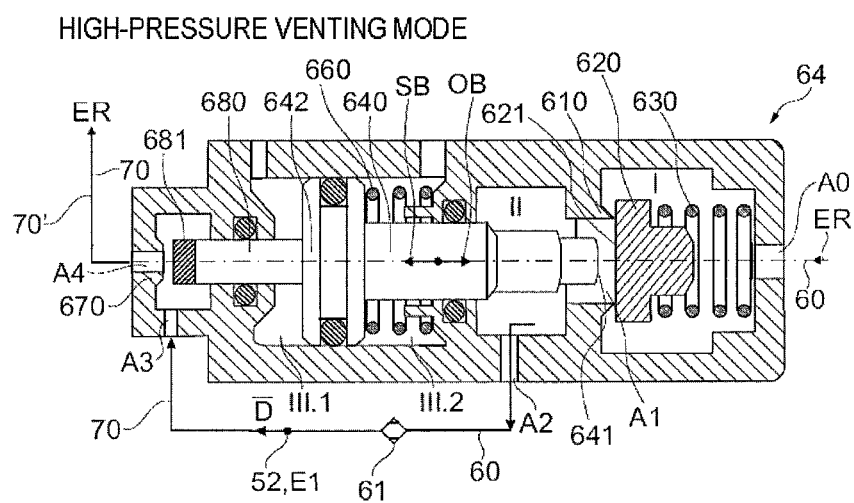

More particularly, the residual pressure holding function achieved in this way is explained by means of a time sequence of states of movement of the control piston 640 with the vent valve element 680, which sequence develops as a result of a falling system or control pressure $P_S$ from a state of the pilot-operated non-return valve 64 in FIG. 9B to a state in FIG. 8B and then to a state in FIG. 6F. That is, in the case of a control or system pressure $P_S$, which is initially significantly above a retention pressure $P_R$, the control piston 640 of the non-return valve 64 adopts a position shown in FIG. 9B, which is referred to as the release mode. When $P_S > P_R$, the control valve 74 is switched, and both the vent valve element 680 and the shutoff valve 620 are raised from the respective valve seats.

In the case of a switching state shown in FIG. 8B for a closing movement SB of the control piston 640, the residual pressure holding function takes effect, since the control valve 74 is still switched and, as the pressure falls in the gallery 95, the control piston 640 makes a transition to a closing movement, during which the control valve element 620 is already seated on the valve seat 610; this occurs at a system or control pressure $P_S$, which is approximately equal to the residual holding pressure $P_R$. The dryer outlet of the air dryer 61, which outlet is opened toward the vent line 70, thus allows complete venting of the air dryer 61 with the gallery 96 closed; this also occurring because the system or control pressure $P_S$ is held constant by virtue of the closed shutoff valve element 620 on the shutoff valve seat 610. The control piston 640 is thus exposed for a relatively long time to a system or control pressure $P_S$, which is approximately equal to the residual holding pressure $P_R$. This leads to a relatively long phase in which the outlet of the air dryer 61 remains open toward the vent line 70.

After the state shown in FIG. 8B for a closing movement SB, the non-return valve 64 formed by means of the shutoff valve seat 610, the shutoff valve element 620 and the valve spring 630 then makes a transition to a position shown in FIG. 6F, in which the control space III.1 is vented, with the control valve 74 being switched; that is, with the retention pressure $P_R$ being released. In this state, the control piston 640 is in the fully closed position thereof, i.e., the shutoff valve element 620 is seated on the shutoff valve 610, and the vent valve element 680 is seated on the vent valve seat 670. Thus, the air dryer 61 is closed both at the inlet on the gallery side and at the outlet on the vent line side. This state is characterized by a control valve 74, which is deenergized and closed and a vented control space III.1 of the control chamber III, with the result that only the mechanical force of the control spring 660 is still acting on the control piston 640; the possible retention pressure $P_R$ in the gallery 95 is not affected thereby.

A noteworthy feature of this sequence of movement is that the regeneration of the air dryer 61 obtained works particularly effectively precisely under system conditions of a low system or control pressure $P_S$, which would otherwise be regarded as disadvantageous, and, possibly, even better than in the case of regeneration in the fully released mode of the non-return valve 64 (FIG. 9B). This functioning is achieved by means of the elucidated state of a vent valve 73, which is still open when the gallery 96 is already shut off by the non-return valve 64, especially in combination with a nominal diameter of the restrictor 62 shown in FIG. 9B, which is set to a relatively low value in this state. As a result, this leads to a compressed air supply installation 10, 11, 12, 20, 30 for operating a pneumatic installation 90 having a compressed air feed 1, a compressed air port 2 leading to the pneumatic installation 90 and a vent port 3 leading to the environment, wherein a main pneumatic line 60 between the compressed air feed 1 and the compressed air port 2 has an air dryer 61 and a non-return valve 64, and a vent line 70 is arranged between the compressed air port 2 and the vent port 3. According to this embodiment, which is, in particular, preferably designed for the residual pressure holding function, the non-return valve 64 is in the form of a pilot-operated non-return valve. This has an integral tappet formed by means of vent valve element 680 and the control piston 640 and the length of which is less than a distance between a vent valve seat 670 of a venting chamber IV and a shutoff valve 610 of a shutoff chamber I of the non-return valve 64. The length is chosen such that—whether a system or control pressure $P_S$ on a control chamber III of the non-return valve 64 is falling or rising—the control pressure $P_S$ that can be derived from the main pneumatic line 60 to the control chamber III when the shutoff valve element 620 is closed reaches a level at the shutoff valve seat 610 that corresponds approximately to the spring pressure, i.e., the residual pressure or retention pressure $P_R$, of a control spring 660 on the control piston 640. By means of the relatively prolonged balance between the control and system pressure $P_S$, on the one hand, and the retention pressure $P_R$, on the other hand, a vent valve seat 670 is held open for a relatively long time, with the result that complete emptying and good regeneration of the air dryer 61 can occur.

Figure 10:
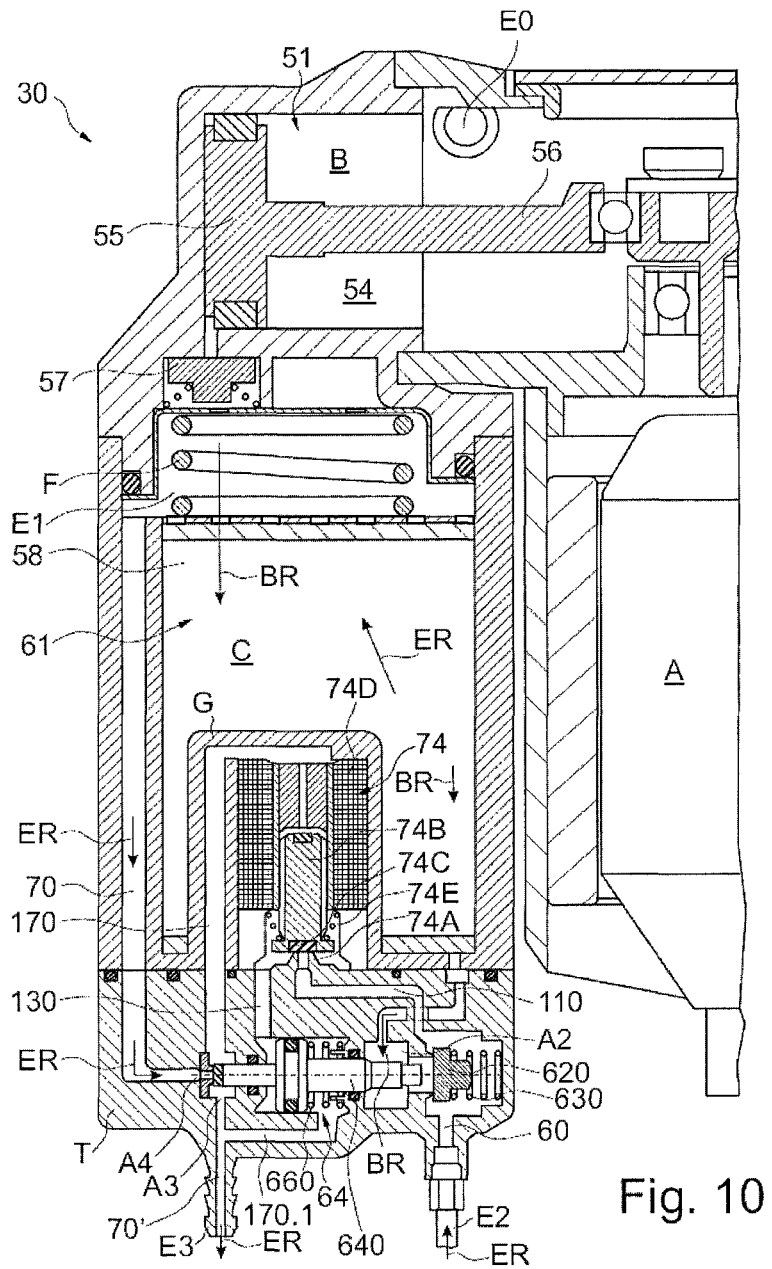
FIG. 10 shows a compressed air supply installation in the form of a device having a housing arrangement with three housing zones, wherein a control valve and an isolating valve embodied as a unit comprising a vent valve and a non-return valve are arranged in the third housing zone.

FIG. 10 shows a preferred design of a compressed air supply installation 30 in the form of a device having a housing arrangement that has a number of housing zones. A drive in the form of a motor M is arranged in a first housing zone A, and the air compressor 51 that can be driven by the motor M is arranged in a second housing zone B, the compressor having a piston 55 that can be moved backward and forward in the compression space 54, wherein a rotary drive of the motor M is transmitted to the piston 55 by a shaft and a connecting rod 56. In the compression space 54, air is fed in via an air feed interface E of the air feed 0. Compressed air at the outlet of the compression space 54 is transferred via an outlet valve 57 or the like to a compressed air feed interface E1 for the compressed air feed 1. The compressed air is released in a third housing zone C of the compressed air supply installation 30. The third housing zone C contains the air dryer 61 and—in a recess G in the wall W of the drying canister 58—the control valve 74 of the compressed air supply installation 30. In principle, the installation is constructed in accordance with the circuit diagram shown in FIG. 6C and FIG. 6D. Housing zones A, B, C are sealed off from one another by one or more seals. The third housing zone C is closed off at the end by a cap T, which can contain a non-return valve 63 or 64—the cap T being shown with non-return valve 64 in the present case.

The cap T furthermore forms a compressed air supply interface E2 for the compressed air feed 2. The compressed air supply interface E2 is pneumatically connected pneumatically to the outlet A2 leading to the through flow chamber II, via which filling of a pneumatic installation 90 in filling direction BR also takes place (e.g., in accordance with FIG. 7B). The cap T also forms a vent interface E3 for the vent port 3 shown above in FIG. 1—according to FIG. 6D connected to the inlet A3 of the venting chamber IV. The vent interface E3 is connected pneumatically to the vent branch line 170.1 and the vent line 170 for connection to a venting space III.2 of the control chamber III. A control pressure for venting is applied to the control valve 74 from E2 via the control line 110, and the valve transmits the control pressure to the control chamber III via the valve seat 74A and the pilot operation line 130. The cap T also forms an electrical control interface S for connection of the control line 83 to the control valve 74. In its dimensions, the cap T is largely congruent with an end contour of the drying canister 58 and can be mounted with a virtually perfect fit on the drying canister 58.

In FIG. 10, the inlet A3 of the venting chamber IV of the non-return valve 64 is also associated with the vent interface E3. The outlet A4 is designated as in FIG. 7B and is arranged in accordance with the circuit diagram in FIG. 7A. In FIG. 10, an outlet A4 of the venting chamber IV, the outlet being pressurized in venting direction ER, is also associated with the pressure-source interface E1. As has been explained, it is possible in this way to integrate non-return valve 64—or also non-return valve 63—into a compressed air supply installation 30 in a manner that is advantageous in terms of design. Overall, the compressed air supply installation 30 with the control valve 74 and a non-return valve 63, 64 can be made available as a compact and space-saving installation. In the present case, in particular, the third housing zone C is formed by the drying canister 58 of the air dryer 61, which contains the drying granules. The drying granules are held under pressure in the drying canister 58 by a spring F. At the end of the drying canister 58, as explained above, the wall W forms a recess G, which is arranged symmetrically, that is, in this case, centrally and parallel, to the axis of the drying canister 58, and which is free of desiccant. The recess G can thus accommodate the control valve 74 in a space-saving manner and in a manner protected by the drying canister 58 and can be closed by means of the cap T. For this purpose, the control valve 74 has a valve seat 74A, which can be closed by a valve seal 74C arranged on a valve armature 74B. The control valve 74, which is closed when deenergized in the present case, can be energized by supplying the coil 74D with a control signal output via the control line 83 to the coil 74D via the control interface S. In this way, the valve armature 74B can be raised from the valve seat 74C against the spring force of a valve spring 74E. In this case, control valve 74 makes a transition from a closed state shown in FIG. 6A and FIG. 7A, for example, to an opened state shown in FIG. 9A in order to release the non-return valve 64, i.e., to transfer it to the release mode shown in FIG. 9B.

In summary, the invention generally relates to a compressed air supply installation 10, 11, 12, 20, 30 for operating a pneumatic installation 90, in particular an air spring installation on a vehicle, having:
a compressed air feed 1,
a compressed air port 2 leading to the pneumatic installation 90,
a vent port 3 leading to the environment,
a first pneumatic connection 60 between the compressed air feed 1 and the compressed air port 2, which connection has an air dryer 61 and an isolating valve,
a second pneumatic connection between the compressed air port 2 and the vent port 3. The isolating valve can be formed with a pneumatically pilot-operated non-return valve 63, 64.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A compressed air supply system for operating a pneumatic system of a vehicle, the compressed air supply system comprising:
   a compressed air feed;
   a compressed air port leading to the pneumatic system;
   a vent port to the environment;
   a vent line between the compressed air port and the vent port;
   a main pneumatic line between the compressed air feed and the compressed air port, the main pneumatic line including:
      an air dryer, and
      a pilot-operated non-return valve including:
         a control chamber divided into a control space and a venting space by a control piston and/or a seal on the control piston, and
         a venting chamber pneumatically connected to the vent line,
   wherein the pilot-operated non-return valve is configured to open automatically in a filling direction from the compressed air feed to the compressed air port and is further configured to be released to allow flow in a venting direction from the compressed air port to the compressed air feed, and
   wherein the venting chamber forms a portion of a vent valve formed as a unit of the pilot-operated non-return valve.

2. The compressed air supply system as claimed in claim 1, wherein the pilot-operated non-return valve is releasable at least one of pneumatically and mechanically.

3. The compressed air supply system as claimed in claim 1, wherein the main pneumatic line and the vent line are connected as separate lines to a common compressed air feed port.

4. The compressed air supply system as claimed in claim 1, wherein the pilot-operated non-return valve is disposed in the main pneumatic line between the air dryer and the compressed air port.

5. The compressed air supply system as claimed in claim 1, wherein the main pneumatic line includes a restrictor and the pilot-operated non-return valve in a pneumatic series circuit.

6. The compressed air supply system as claimed in claim 1, further comprising:
   a control valve; and
   a pneumatic control line between the main pneumatic line and the control valve;
   wherein the pilot-operated non-return valve is releasable by the control valve using a pressure derived from the main pneumatic line via the pneumatic control line.

7. The compressed air supply system as claimed in claim 6, wherein the pilot-operated non-return valve is releasable by pressurizing a pneumatic pilot operation line between the control valve and the pilot operated non-return valve.

8. The compressed air supply system as claimed in claim 1, the pilot-operated non-return valve further including:
   a shutoff chamber pneumatically connected to the main pneumatic line, a through flow chamber pneumatically connected to the main pneumatic line,
a shutoff valve seat between the shutoff chamber and the through flow chamber, and
a shutoff valve element configured to shut off the shutoff valve seat in shutoff mode and to open the shutoff valve seat in release mode,
wherein the control chamber is pneumatically connected to a control line via a pneumatic pilot operation line and is isolated from the through flow chamber, and
wherein the control chamber is configured to actuate a control piston acting on the shutoff valve element.

9. A pneumatic system, comprising:
the compressed air supply system as claimed in claim 1; and
an air spring system including:
a gallery,
at least one branch line connected pneumatically to the gallery,
at least one of a bellows and a reservoir, and
a directional control valve ahead of at least one of the bellows and the reservoir.

10. A method for operating a pneumatic system by the compressed air supply system as claimed in claim 1, the method comprising:
filling the pneumatic system by compressed air flow routed via a main pneumatic line from the compressed air supply system, wherein the pilot-operated non-return valve in the main pneumatic line opens automatically;
holding pressure in the pneumatic installation, wherein the main pneumatic line is shut off against compressed air flow from the pneumatic system by the pilot-operated non-return valve; and
venting the pneumatic system by releasing the pilot-operated non-return valve in the main pneumatic line to allow compressed air flow from the pneumatic system through the main pneumatic line.

11. The method as claimed in claim 10, wherein releasing the pilot-operated non-return valve is caused by a pressure derived from the main pneumatic line.

12. The method as claimed in claim 11, further comprising pneumatically activating a vent valve in the vent line by the pressure derived from the main pneumatic line that causes releasing of the pilot-operated non-return valve.

13. The method as claimed in claim 10, wherein the pneumatic system is a vehicle air spring system.

14. The compressed air supply system as claimed in claim 1, wherein the pilot-operated non-return valve has a port configured to remain connected to the vent port in shut-off and release modes of the valve.

15. The compressed air supply system as claimed in claim 1, wherein the pilot-operated non-return valve in the main pneumatic line between the compressed air feed and the compressed air port is configured as a releasable throttle check valve.

16. The compressed air supply system as claimed in claim 1, further comprising a control valve configured to simultaneously cause opening of the vent valve and release of the pilot-operated non-return valve to allow flow in the venting direction from the compressed air port to the compressed air feed.

17. The compressed air supply system as claimed in claim 1, wherein the pilot-operated non-return valve is configured to be released to allow flow in a venting direction from the compressed air port through the air dryer to the compressed air feed so as to regenerate the air dryer.

18. The compressed air supply system as claimed in claim 1, wherein the control space is pneumatically connected to a control line via a pneumatic pilot operation line, and
wherein the venting space is pneumatically connected to the vent line via a vent branch line.

19. A compressed air supply system for operating a pneumatic system of a vehicle, the compressed air supply system comprising:
a compressed air feed;
a compressed air port leading to the pneumatic system;
a vent port to the environment;
a main pneumatic line between the compressed air feed and the compressed air port, the main pneumatic line including an air dryer and a pilot-operated non-return valve;
a vent line between the compressed air port and the vent port; and
a double relay piston that is pressurizable such that the pilot-operated non-return valve is releasable and a vent valve is actuatable substantially simultaneously.

20. The compressed air supply system as claimed in claim 19, wherein the pilot-operated non-return valve includes a control chamber divided by a dividing seal on a control piston into (i) a control space connected pneumatically to a control line via a pneumatic pilot operation line, and (ii) a venting space.

21. The compressed air supply system as claimed in claim 20, wherein the control piston has an annular bead configured to carry the dividing seal, the annular bead having a second side facing the venting space and a first side facing the control space, a surface of the second side being smaller than a surface of the first side.

22. The compressed air supply system as claimed in claim 20, wherein the venting space of the control chamber is pneumatically, adjustably connectable by at least one of the control valve and a further vent line to one of a control line via a pneumatic pilot operation line and the vent line.

23. The compressed air supply system as claimed in claim 19, wherein the double relay piston includes actuating elements, the actuating elements being one of integral and separate elements, the actuating elements including a relay release element and a relay vent valve element.

24. A compressed air supply system for operating a pneumatic system of a vehicle, the compressed air supply system comprising:
a compressed air feed;
a compressed air port leading to the pneumatic system;
a vent port to the environment;
a main pneumatic line between the compressed air feed and the compressed air port, the main pneumatic line including an air dryer and a pilot-operated non-return valve; and
a vent line between the compressed air port and the vent port,
wherein the pilot-operated non-return valve includes:
a shutoff chamber connected pneumatically to the main pneumatic line,
a through flow chamber connected pneumatically to the main pneumatic line,
a control chamber connected pneumatically to a control line via a pneumatic pilot operation line and isolated from the through flow chamber,
a venting chamber connected pneumatically to the vent line,
a shutoff valve seat between the shutoff chamber and the through flow chamber, a shutoff valve element configured to shut off the shutoff valve seat in shutoff mode and to open the shutoff valve seat in release mode,
a control piston actuatable by the control chamber and configured to act on the shutoff valve element,
a vent valve seat between the venting chamber and the vent line, and
a vent valve element configured to shut off the shutoff valve seat in the shutoff mode and to open the shutoff valve seat in the release mode.

25. The compressed air supply system as claimed in claim 24, wherein the vent valve element forms an integral tappet with the control piston, and wherein the vent valve element is formed on a side of a dividing seal of the control piston.

26. The compressed air supply system as claimed in claim 25, wherein the control piston includes at least one first stepped portion and one second stepped portion with different cross-sectional widths.

27. A compressed air supply system for operating a pneumatic system of a vehicle, the compressed air supply system comprising:
a compressed air feed;
a vent port to the environment;
a compressed air port leading to the pneumatic system;
a vent line between the compressed air port and the vent port; and
a main pneumatic line between the compressed air feed and the compressed air port, the main pneumatic line including:
an air dryer, and
a pilot-operated non-return valve including a control chamber, the control chamber being divided into a control space and a venting space by a control piston and/or a seal on the control piston; and
a control valve; and
a pneumatic control line connecting the control valve to the compressed air port,
wherein the pilot-operated non-return valve is configured to open automatically in a filling direction from the compressed air feed to the compressed air port,
wherein the control space is connected to a pilot operation branch line and the venting space is connected to a second pilot operation branch line, and
wherein the control valve is configured to, in a controlled position, connect the pneumatic control line to the control chamber of the pilot-operated non-return valve so as to release the pilot-operated non-return valve and thereby allow flow in a venting direction from the compressed air port to the compressed air feed.

28. The compressed air supply system as claimed in claim 27, further comprising:
a vent valve disposed in the vent line;
wherein the vent valve is biased closed, and
wherein the control valve is configured to, in the controlled position, connect the pneumatic control line to the vent valve so as to open the vent valve and thereby connect the main pneumatic line to the vent port.

29. The compressed air supply system as claimed in claim 27, wherein the control valve is further configured to, in the controlled position, connect the pneumatic control line to the pilot operation branch line.

30. The compressed air supply system as claimed in claim 29, wherein the control valve is further configured to, in an uncontrolled position, connect the pilot operation branch line and the second pilot operated branch line to the vent port.

31. The compressed air supply system as claimed in claim 27, wherein the pilot-operated non-return valve further includes a shutoff chamber connected pneumatically to the main pneumatic line, and a through flow chamber connected pneumatically to the main pneumatic line.

32. The compressed air supply system as claimed in claim 31, wherein the pilot-operated non-return valve further includes a shutoff valve element disposed in the shutoff chamber and a valve spring configured to bias the shutoff valve element against a shutoff valve seat.

33. The compressed air supply system as claimed in claim 32, wherein the pilot-operated non-return valve further includes a control piston, wherein when the pneumatic control line is configured to pressurize the control chamber of the pilot-operated non-return valve when connected thereto by the control valve, and wherein the control piston is configured to, when the control chamber is pressurized, displace the shutoff valve element from the shutoff valve seat so as to release the pilot-operated non-return valve.

* * * * *